United States Patent
Pogorelik et al.

(10) Patent No.: US 11,574,175 B2
(45) Date of Patent: Feb. 7, 2023

(54) SECURITY OPTIMIZING COMPUTE DISTRIBUTION IN A HYBRID DEEP LEARNING ENVIRONMENT

(71) Applicant: Intel Corporation, Santa Clara, CA (US)

(72) Inventors: Oleg Pogorelik, Lapid (IL); Alex Nayshtut, Gan Yavne (IL); Michael E. Kounavis, Portland, OR (US); Raizy Kellermann, Jerusalem (IL); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 279 days.

(21) Appl. No.: 16/912,152

(22) Filed: Jun. 25, 2020

(65) Prior Publication Data

US 2021/0406652 A1    Dec. 30, 2021

(51) Int. Cl.
*G06F 21/62*    (2013.01)
*G06N 3/08*    (2006.01)
(Continued)

(52) U.S. Cl.
CPC ......... *G06N 3/063* (2013.01); *G06F 21/6245* (2013.01); *G06K 9/6256* (2013.01);
(Continued)

(58) Field of Classification Search
CPC .......... G06N 3/063; G06N 3/04; G06N 3/084; G06N 5/04; G06N 20/00; G06N 3/08; G06F 21/6245; G06K 9/6256
See application file for complete search history.

(56) References Cited

U.S. PATENT DOCUMENTS 10,572,773 B2 * 2/2020 Yehezkel Rohekar .. G06N 3/08
10,810,491 B1 * 10/2020 Xia ........................... G06N 3/08
(Continued)

FOREIGN PATENT DOCUMENTS

CN    113849827 A    12/2021

OTHER PUBLICATIONS

Sharma et al. "ExpertMatcher: Automating ML Model Selection for Users in Resource Constrained Countries" 33rd Conference on Neural Information Processing Systems (NeurIPS 2019), Vancouver CN, Oct. 5, 2019, pp. 1-6.
(Continued)

*Primary Examiner* — Hosuk Song
(74) *Attorney, Agent, or Firm* — Jaffery Watson Mendonsa & Hamilton LLP

(57) ABSTRACT

Embodiments are directed to security optimizing compute distribution in a hybrid deep learning environment. An embodiment of an apparatus includes one or more processors to determine security capabilities and compute capabilities of a client machine requesting to use a machine learning (ML) model hosted by the apparatus; determine, based on the security capabilities and based on exposure criteria of the ML model, that one or more layers of the ML model can be offloaded to the client machine for processing; define, based on the compute capabilities of the client machine, a split level of the one or more layers of the ML model for partition of the ML model, the partition comprising offload layers of the one or more layers of the ML model to be processed at the client machine; and cause the offload layers of the ML model to be downloaded to the client machine.

19 Claims, 17 Drawing Sheets

(51) Int. Cl.
*G06N 3/063* (2006.01)
*G06N 3/04* (2006.01)
*G06N 5/04* (2006.01)
*G06K 9/62* (2022.01)

(52) U.S. Cl.
CPC .............. *G06N 3/04* (2013.01); *G06N 3/084* (2013.01); *G06N 5/04* (2013.01)

(56) References Cited

U.S. PATENT DOCUMENTS

| | | | |
|---|---|---|---|
| 11,176,423 B2* | 11/2021 | Desai | G06N 5/04 |
| 2019/0108447 A1 | 4/2019 | Kounavis et al. | |
| 2019/0295092 A1* | 9/2019 | Lu | G06N 20/00 |
| 2021/0055915 A1* | 2/2021 | Guo | G06F 8/34 |
| 2021/0406652 A1 | 12/2021 | Pogorelik et al. | |

OTHER PUBLICATIONS

Singh et al. "Detailed comparison of communication efficiency of split learning and federated learning" Massachusetts Institute of Technology, Cambridge MA, Sep. 18, 2019, pp. 2-5.

Vepakomma et al. "Reducing Leakage in Distributed Deep Learning for Sensitive Health Data" ICLR AI for social good workshop 2019, 2019, pp. 1-6.

Vepakomma et al. "Split learning for health: Distributed deep learning without sharing raw patient data" 32nd Conference on Neural Information Processing Systems (NIPS 2018), Montreal, CN, Dec. 3, 2018, pp. 1-7.

* cited by examiner

590

Determine security capabilities and compute capabilities of a client machine requesting to use a machine learning (ML) model hosted by the apparatus
592

Determine, based on the security capabilities and based on exposure criteria of the ML model, that one or more layers of the ML model can be offloaded to the client machine for processing
594

Define, based on the compute capabilities of the client machine, a split level of the one or more layers of the ML model for partition of the ML model, the partition comprising offload layers of the one or more layers of the ML model to be processed at the client machine
596

Cause the offload layers of the ML model to be downloaded to the client machine
598

FIG. 5C

SECURITY OPTIMIZING COMPUTE DISTRIBUTION IN A HYBRID DEEP LEARNING ENVIRONMENT

TECHNICAL FIELD

Embodiments described herein generally relate to the field of electronic devices and, more particularly, to security optimizing compute distribution in a hybrid deep learning environment.

BACKGROUND

AI (Artificial Intelligence) and ML (Machine Learning) training and inferencing are vulnerable to multiple different adversarial machine learning threats. These threats include attacks to model extraction or reverse engineering the model, poisoning of a model during training, inversion attack to extract training data, and evasion attack in which the attacker modifies the input to evade detection.

Adversarial ML attacks are possible during both training and inferencing. As AI and ML processing continue to move into new technical fields, conventional reliance on algorithmic methods to detect and thwart adversarial attacks is insufficient, and thus additional security measures may be implemented.

BRIEF DESCRIPTION OF THE DRAWINGS

Embodiments described here are illustrated by way of example, and not by way of limitation, in the figures of the accompanying drawings in which like reference numerals refer to similar elements.

FIG. 5C is a flowchart illustrating another example flow for dynamic NN distribution for security optimization performed by a server system, in accordance with implementations of the disclosure

DETAILED DESCRIPTION

Figure 1:
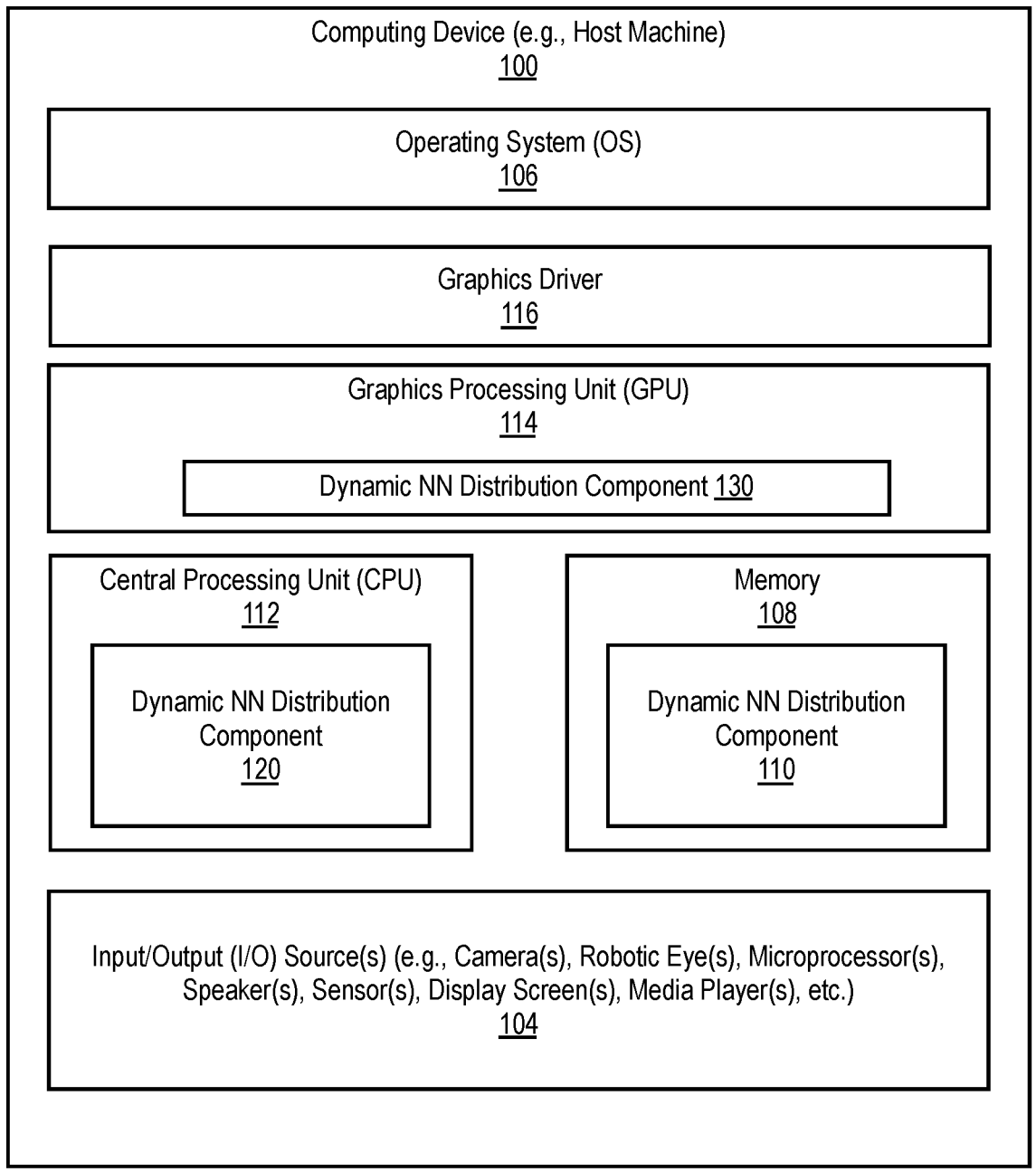
FIG. 1 illustrates a computing device employing a dynamic neural network (NN) distribution component according to one implementation of the disclosure.

Embodiments described herein are security optimizing compute distribution in a hybrid deep learning environment.

In the following description, numerous specific details are set forth. However, embodiments, as described herein, may be practiced without these specific details. In other instances, well-known circuits, structures and techniques have not been shown in detail in order not to obscure the understanding of this description.

Conventional neural network (NN) architectures for machine learning (ML) and deep learning (DL) solutions, such as deep neural network (DNN) architectures, are associated with security and privacy issues. When a NN architecture is run on a server device, such as by a cloud service provider (CSP), a client machine utilizing the NN architecture may have to push content to the server (e.g., CSP) and, as such, place the information contained in the content (such as confidential data) at risk of being disclosed by either the network or the server (e.g., CSP) adversaries. In addition, some servers and/or CSPs may not seek to put their models on the client-side devices, as such client-side systems are potentially open for intellectual property (IP) theft. Furthermore, some client-side devices may have resource constraints that do not allow for running NN architecture payloads altogether.

Embodiments provide for a novel technique for running part of a model (e.g., ML model) of a NN architecture on a client-side device while running the remainder of the model on the server-side (e.g., CSP) device. This novel technique is used to address the above-noted performance and/or security issues. Implementations of the disclosure utilize a hybrid deep learning NN architecture, where a client-side device is performing basic (e.g., standardized) input processing, while leaving the server-side device(s) (e.g., cloud-side devices or partition) to perform the rest of the processing (e.g., sensitive IP is concentrated in high model layers). The client-side device can forward to the server-side device(s) compressed information (e.g., vector features) that, after pre-processing, do not contain sensitive details.

Embodiments provide for a novel technique for addressing the above-mentioned issues by offering dynamic NN payload distribution between the client and server, where the dynamic NN payload distribution is dynamically determined based on performance and security capabilities of the data (e.g., client-side device) and model owners (e.g., server-side/CSP-side developers). The client and server can exchange information about privacy and security demands, as well as available client-side compute resources, in order to negotiate a mutually-acceptable decision regarding an optimal split of the NN payload between the client and server. As a result, sensitive data does not leave the client-side device (e.g., information is highly obfuscated), which keeps the security levels high. At the same time, parts (e.g., IP) of the model are protected by keeping it running on the server-side device. In some implementations, the split is performed with respect to client-side resource and capabilities and provides the improved power and performance for both the client and server-side devices.

Embodiments of the disclosure further provide for a novel NN architecture that uses independent training of layers of the distributed NN architecture described herein, as well as uses a heterogeneous distributed deep learning architecture. The independent training of layers of the distributed NN architecture and the heterogeneous distributed deep learning may be combined with the techniques for dynamic NN distribution for security optimization as described herein.

Implementations of the disclosure may provide improvements and benefits over conventional approaches such as, but not limited to, improved security for a given system configuration, ease of deployment without extensive development and integration, improved performance as compared to "pure server side" or "pure client side" ML models, and/or improved network traffic in cases where inference (e.g., inference stage of the model) uses the client-specific portions.

It is contemplated that implementations of the disclosure, including the security optimizing compute distribution of DNN payload distribution, independent training of layers of the distributed NN architecture, and/or the heterogeneous distributed deep learning, are not limited to software or hardware implementation and as will be further described in this document, this novel technique may be applied and implemented in software, hardware, or any combination thereof, such as firmware. For example, the mass amounts of generic compute operations performed by a distributed NN architecture may use processing cores more flexible than graphics processing units (GPUs) to be able to handle any amount of workload. Furthermore, any scoring or classification processes may be implemented using the learned algorithm and not the entire layered architecture, such as using custom accelerators, field-programmable gate arrays (FPGAs), etc. For example, training may be performed using the novel distributed NN architecture with dynamic payload distribution, while scoring may be done by simply implementing the learned algorithm. Further, implementations of the distributed NN architecture described herein may be viewed as a machine for generating highly complicated custom algorithms for addressing and solving specific tasks (e.g., face recognition, face detection, pedestrian detection, gesture recognition, etc.).

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), neural network (NN), deep neural network (DNN), recurrent neural network (RNN), and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a dynamic neural network (NN) distribution component 110 according to one implementation of the disclosure. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SOC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), user-mode driver framework (UMDF), or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be utilized for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, dynamic NN distribution component 110 may be hosted by memory 108 in communication with I/O source(s) 104, such as microphones, speakers, etc., of computing device 100. In another embodiment, dynamic NN distribution component 110 may be part of or hosted by operating system 106. In yet another embodiment, dynamic NN distribution component 110 may be hosted or facilitated by graphics driver 116. In yet another embodiment, dynamic NN distribution component 110 may be hosted by or part of graphics processing unit ("GPU" or simply graphics processor") 114 or firmware of graphics processor 114; for example, dynamic NN distribution component 130 may be embedded in or implemented as part of the processing hardware of graphics processor 114, such as in the form of dynamic NN distribution component 110. Similarly, in yet another embodiment, dynamic NN distribution component 110 may be hosted by or part of central processing unit ("CPU" or simply "application processor") 112; for example, dynamic NN distribution component 120 may be embedded in or implemented as part of the processing hardware of application processor 112, such as in the form of dynamic NN distribution component 110. In some embodiments, dynamic NN distribution component 110 may be provided by one or more processors including one or more of a graphics processor, an application processor, and another processor, wherein the one or more processors are co-located on a common semiconductor package.

It is contemplated that embodiments are not limited to certain implementation or hosting of dynamic NN distribution component 110 and that one or more portions or components of dynamic NN distribution component 110 may be employed or implemented as hardware, software, or any combination thereof, such as firmware. In one embodiment, for example, the dynamic NN distribution component may be hosted by a machine learning processing unit which is different from the GPU. In another embodiment, the dynamic NN distribution component may be distributed between a machine learning processing unit and a CPU. In another embodiment, the dynamic NN distribution component may be distributed between a machine learning processing unit, a CPU and a GPU.

Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
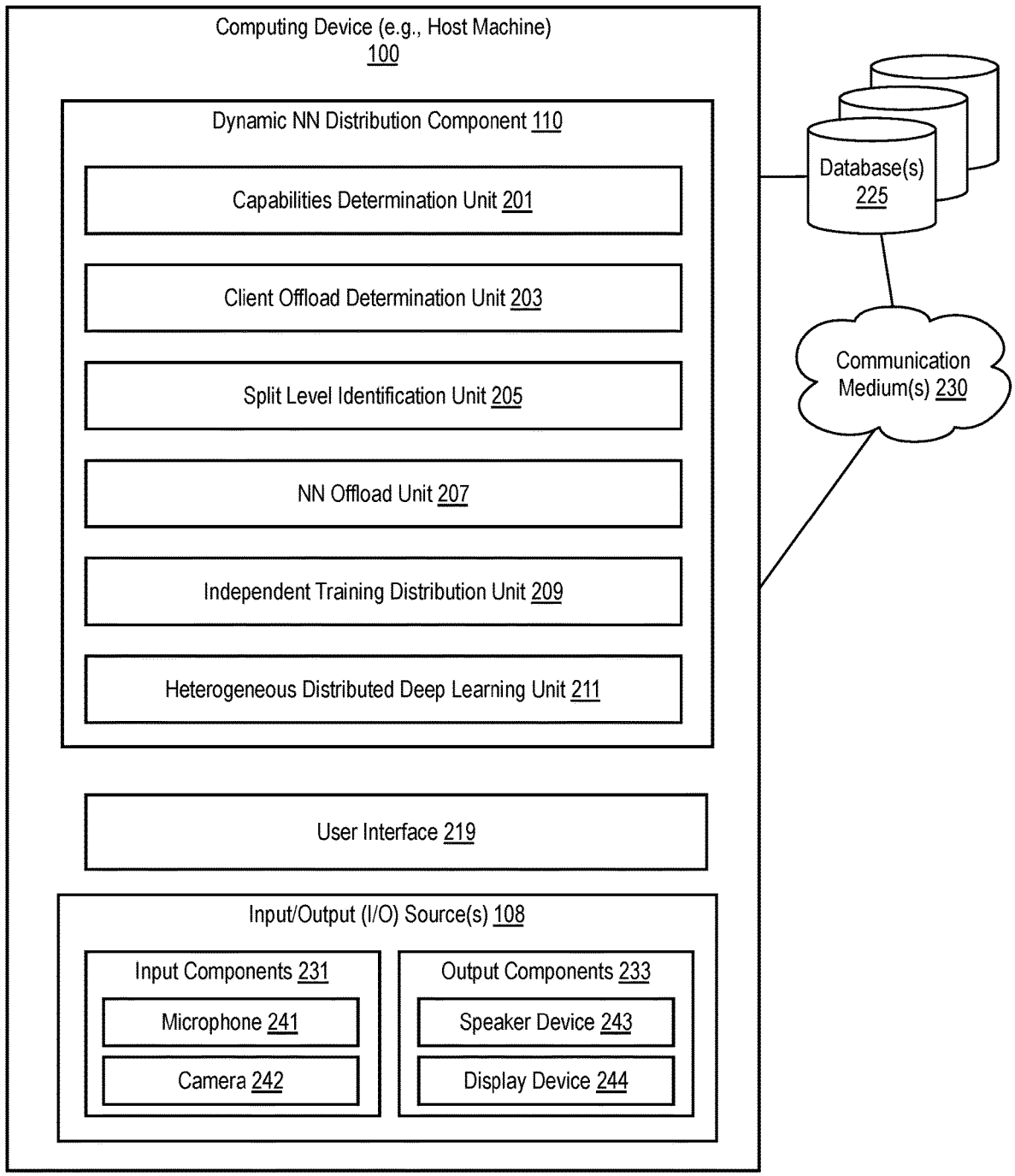
FIG. 2 illustrates dynamic NN distribution component, according to one implementation of the disclosure.

FIG. 2 illustrates dynamic NN distribution component 110 of FIG. 1, according to one implementation of the disclosure. For brevity, many of the details already discussed with reference to FIG. 1 are not repeated or discussed hereafter. In one embodiment, dynamic NN distribution component 110 may include any number and type of components, such as (without limitations): capabilities determination unit 201; client offload determination unit 203; split level identification unit 205; NN offload unit 207; independent training distribution unit 209; and heterogeneous distributed deep learning unit 211.

Computing device 100 is further shown to include user interface 219 (e.g., graphical user interface (GUI) based user interface, Web browser, cloud-based platform user interface, software application-based user interface, other user or application programming interfaces (APIs), etc.). Computing device 100 may further include I/O source(s) 108 having input component (s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as dynamic NN distribution component 120 and/or dynamic NN distribution component 130 hosted by application processor 112 and/or graphics processor 114, respectively, of FIG. 1 having to facilitate or execute the corresponding logic to perform certain tasks.

For example, as illustrated, input component (s) 231 may include any number and type of microphone(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

As previously described, conventional NN architectures for machine learning and deep learning solutions, such as DNN architectures, are associated with security and privacy issues. When a NN architecture is run on a server device such as by a cloud service provider (CSP), a client machine utilizing the NN architecture may have to push content to the server (e.g., CSP) and, as such, place the information contained in the content at risk of being disclosed by either the network or the server (e.g., CSP) adversaries. In addition, some servers and/or CSPs may not seek to put their models on the client-side devices, as such systems are potentially open for intellectual property (IP) theft. Furthermore, some client-side device may have resource constraints that do not allow for running NN architecture payloads altogether.

Embodiments provide for a novel technique for running part of a model (e.g., ML model) of a NN architecture on the client-side device and the rest of the model on the server-side device. This novel technique is used to address the above-noted performance and/or security issues. Implementations of the disclosure utilize a hybrid deep learning NN architecture, where a client-side device is performing basic (e.g., standardized) input processing, while leaving the server-side device(s) (e.g., cloud-side devices or partition) to perform the res of the processing (e.g., sensitive IP is concentrated in high model layers). The client-side device can forward to the server-side device(s) compressed information (e.g., vector features) that, after pre-processing, do not contain sensitive details.

Embodiments provide for a novel technique for addressing the above-mentioned issues by offering dynamic NN payload distribution between the client and server, where the dynamic NN payload distribution is dynamically determined based on performance and security capabilities of the data (e.g., client-side device) and model owners (e.g., server-side/CSP-side developers). The client and server can exchange information about privacy and security demands, as well as available client-side compute resources, in order to negotiate a mutually-acceptable decision regarding an optimal split of the NN payload between the client and server. As a result, sensitive data does not leave the client-side device (e.g., information is highly obfuscated), which keeps the security levels high. At the same time, parts (e.g., IP) of the model are protected by keeping it running on the server-side device. In some implementations, the split is performed with respect to client-side resource and capabilities and provides the improved power and performance for both the client and server-side devices.

Embodiments provide for a novel technique that further provides for a novel NN architecture that utilizes independent training of layers of the distributed NN architecture described herein, as well as (or separately) utilizes a heterogeneous distributed deep learning architecture, as described in detail further below. The independent training of layers of the distributed NN architecture and/or the heterogeneous distributed deep learning may be combined with the techniques for dynamic NN distribution for security optimization, as described below.

Dynamic Neural Network Distribution for Security Optimization

As supported by dynamic NN distribution component 110 and/or one or more of dynamic NN distribution component 120, 130 of FIG. 1, a novel NN architecture is offered to perform various ML and DL functions by providing security optimizing compute distribution in a hybrid deep learning environment.

Figure 3:
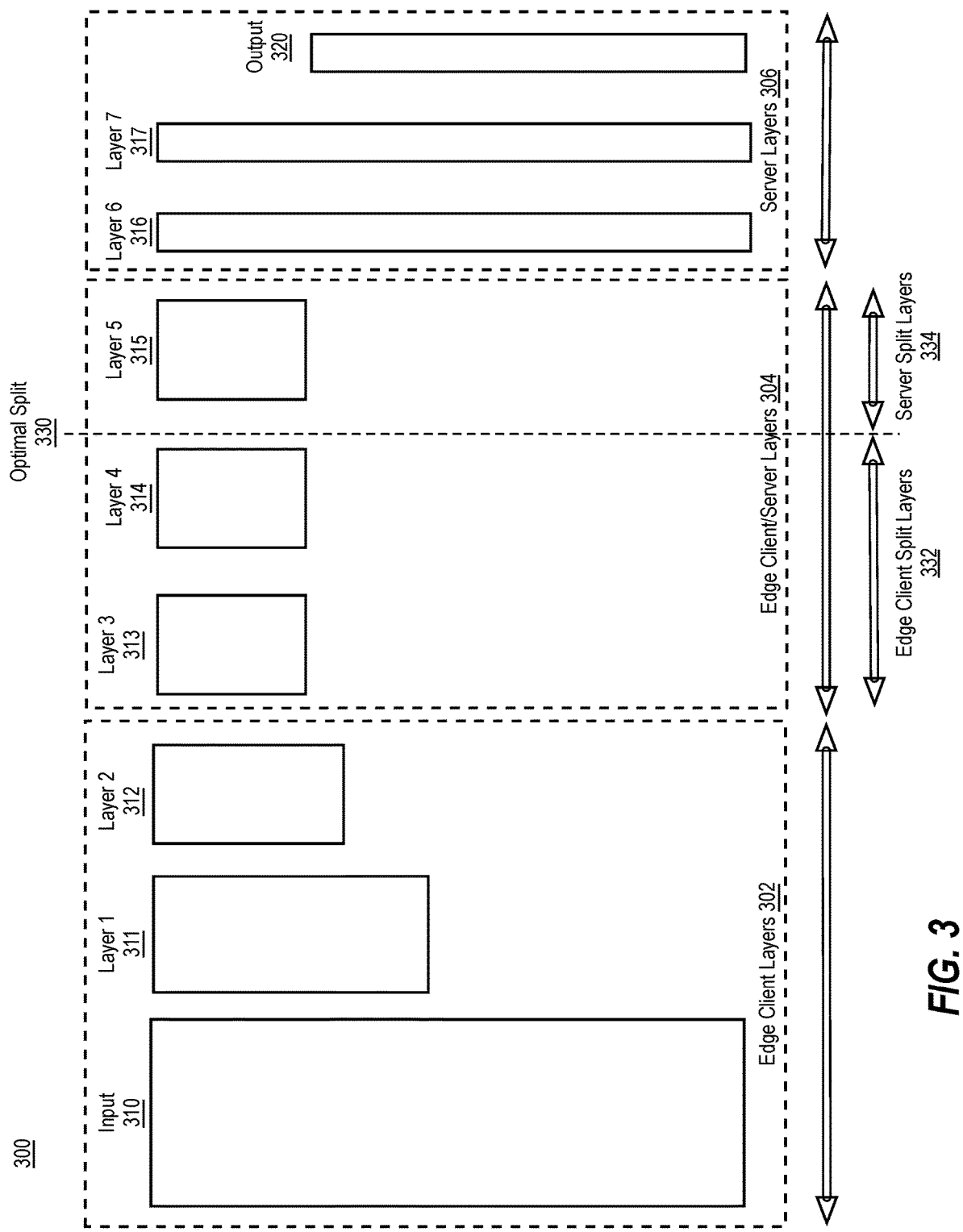
FIG. 3 is an illustration of elements of an NN architecture to provide security optimizing compute distribution in a hybrid deep learning environment, in accordance with implementations of the disclosure.

FIG. 3 is an illustration of elements of an NN architecture 300 to provide security optimizing compute distribution in a hybrid deep learning environment, in accordance with implementations of the disclosure. Example NN architecture 300 may be supported by one or more of the components of computing device 100 described with respect to FIGS. 1 and 2. For example, dynamic NN distribution component 110 may be used to provide for optimizing compute distribution in NN architecture 300. In another example, one or more of the capabilities determination unit 201; client offload determination unit 203; split level identification unit 205; NN offload unit 207; independent training distribution unit 209; and heterogeneous distributed deep learning unit 211 described with respect to FIG. 2 may be used to provide for optimizing compute distribution in NN architecture 300.

As shown, the example NN architecture 300 may include a plurality of layers 310-320 of a model (e.g., ML model). The layers may include (without limitation) an input layer 310, convolutional layers (e.g., any of layers 311-317), logic layers (e.g., any of layers 311-317), softmax layer (e.g., any of layers 311-317), and/or an output layer 320. In implementations of the disclosure, using a dynamic NN distribution component, such as dynamic NN distribution component 110 of FIGS. 1 and 2, the layers 310-320 may be grouped into edge client layers 302, edge client/server layers 304, or server layers 306. Edge client layers 302 indicate those layers (e.g., layer 310-312) that, if offloaded to the edge client device, should run on the edge client to ensure that vector features do not include confidential data or details allowing network or cloud-based adversaries to uncover sensitive details. Edge client/server layers 304 indicate those layers (e.g., layers 313-315) that are determined to be capable of being run on either the edge client or the server without causing security issues. Server layers 306 indicate the layers (e.g., layer 316-320) that are determined to include model IP that cannot be securely run on the edge client device and thus should be run on the server-side.

Implementations of the disclosure may dynamically determine an optimal split 330 (also referred to herein as a dynamic partition) of a payload (e.g., layers 310-320) of the NN architecture 300 within the edge client/server layers 304, where the optimal split 330 may vary based on the particular edge client utilizing the NN architecture 300. The optimal split 300 may divide the edge client/server layers 304 into edge client split layers 332 (e.g., including layer 3 313 and layer 4 314) and server split layers 334 (e.g., including layer 5 315). In some implementations, the model of NN architecture 300 can be dynamically partitioned before system instantiation by the edge client device. A client side partition can be downloaded to the client machine for further inputs pre-processing. In some implementations, the optimal split 330 may include a plurality of optimal splits in the NN architecture 300 and is not limited to a single optimal split 330.

Dynamic NN distribution component determines, based on information about privacy and security demands, as well as available client-side compute resources, an optimal split 330 of the payload (e.g., layers 310-320) of the model of the NN architecture 300 between the client (e.g., edge client) and server-side device(s) (e.g., server, CSP, model owner, etc.). The optimal split 330 may indicate a demarcation of the layers 310-330 between the edge client and the server. As shown in FIG. 3, the optimal split 330 is determined for the model of NN architecture 300, where layers 310-314 are offloaded to the edge client, while layers 315-320 remain on the server-side. In some implementations, the split is performed with respect to client-side resource and capabilities and provides the improved power and performance for both the client and server-side devices.

Figure 4:
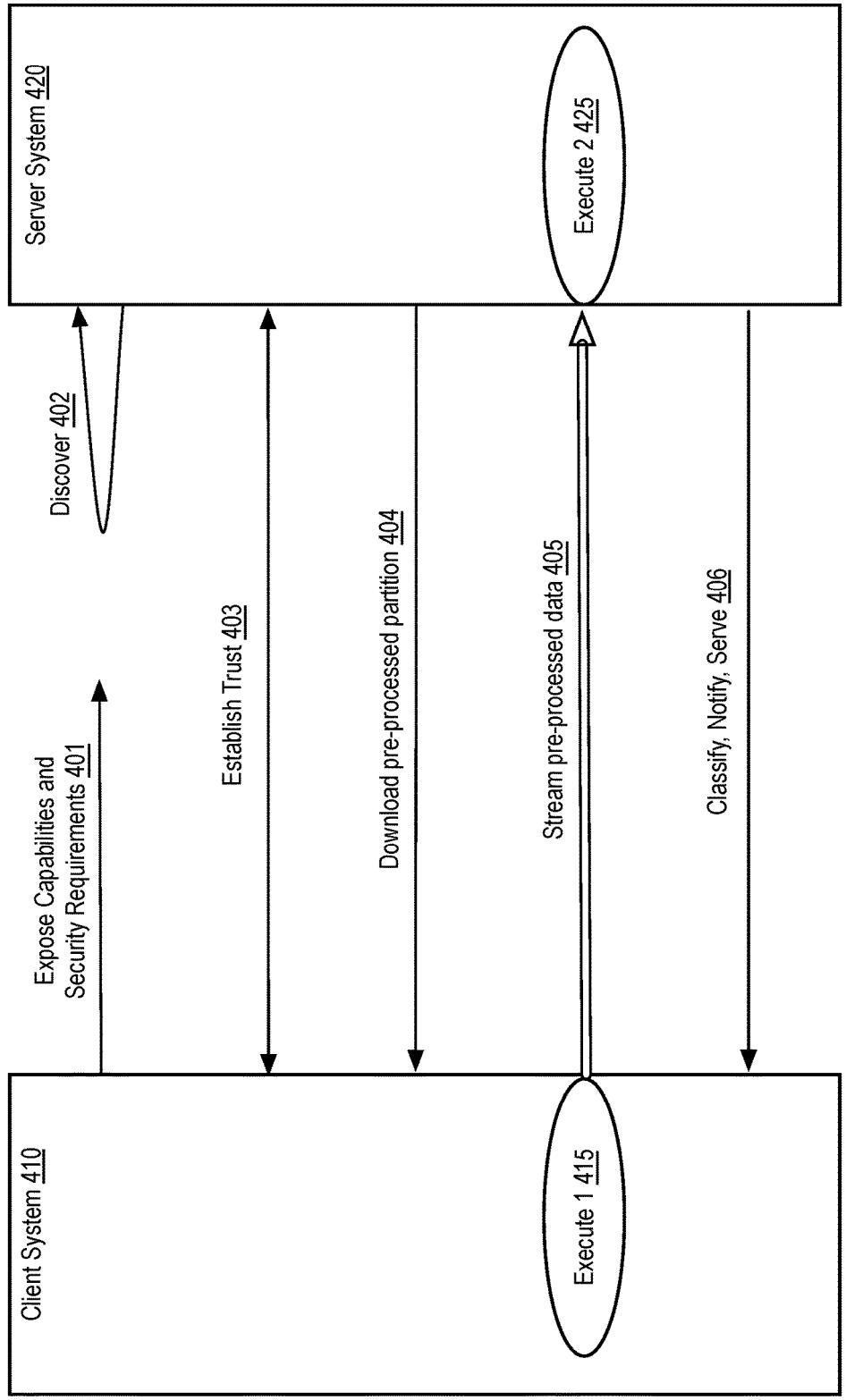
FIG. 4 illustrates a system to provide security optimizing compute distribution in a hybrid deep learning environment, in accordance with implementations of the disclosure.

FIG. 4 illustrates a system 400 to provide security optimizing compute distribution in a hybrid deep learning environment, in accordance with implementations of the disclosure. System 400 may include a client system 410 and a server system 420. One or more of client system 410 and/or server system 420 may be the same as computing device 100 described with respect to FIGS. 1 and 2. System 400 depicts a high-level depiction of flow of communications between client system 410 and server system 420 to provide for dynamic NN distribution of payload of a model (e.g., ML model) between the client system 410 and server system 420. In one implementation, NN architecture 300 described with respect to FIG. 3 may be distributed between client system 410 and server system 420 using the communication flow depicted in FIG. 4.

Client system 410 may begin by exposing capabilities and security requirements to server system 420 at 401. Server system 420 may simultaneously discover such exposed capabilities and security requirements of the client system 410 at 402. Client system 410 and server system 420 may then establish trust with one another at 403. Once trust is established between client system 410 and server system 420, client system 410 may download a pre-processed partition of a NN architecture, such as NN architecture 300 of FIG. 3, from server system 420 at 404. In one implementation, the pre-processed partition downloaded to client system 410 is determined using a dynamic NN distribution technique described herein. For example, the pre-processed partition may be layers 310-314 indicated by optimal split 330 of NN architecture 300 described with respect to FIG. 3.

Client system 410 may then perform processing of the model associated with the downloaded NN partition at 415. Client system 410 may stream pre-processed data from the processing of 415 to the server system 420 at 405. Server system 420 may then continue with processing of the model using the stream pre-processed data at 425. Server system 420 may then classify, notify, and/or server model data to the client system 410 at 406.

In one implementation, the dynamic partitioning of a model of a NN architecture may be performed in accordance with a calculated client security score (also referred to as a security score) and a mutually-established security and performance requirements of both a data owner (e.g., edge client or client side) and model owner (e.g., server and/or CSP). In one implementation, the following factors can be considered in a security score calculation.

A first factor may include a level of model protection corresponding to the model owner. This level of model protection may be referred to as the model protection level (MPL). Model IP protection requirements established by the model owner (e.g., server, CSP, etc.). For example, recognizing that DNN IP is usually concentrated in the higher levels, a model owner may train the model in a special way and specify "IP layers" explicitly. MPL may be specified as the lowest layer (counting from the first input layer) that could be offloaded to the client without putting at risk confidential model IP. For example, an MPL=17 (out of 33 layers) may be specified. In some implementations, the MPL may be determined using other methodologies, such as applying an ML model if identify the MPL or utilizing vectors or other complex algorithms to identify and/or determine the MPL.

In some implementations, the server side may learn client capabilities and allow "relaxed IP protection" in cases when the edge client has advanced protection capabilities, such as running a model in a trusted execution environment (TEE) (e.g., assuming model is downloaded encrypted and opened inside the TEE, etc.).

In one implementation, the server side may manage a number of security constants per feature (RSCi) that can be used in calculating a relaxed MPL (RMPL). For example, RMPL=(SUM (RSCi*MPLi))/n, where n is the number of features supported by the client machine, RSCi is a relaxed constant related to appropriate feature, and MPLi is the MPL set per appropriate feature.

A second factor may include a data protection level (DPL). DPL may be specified as the lowest layer (counting from the output) that can run on the client machine (e.g., client-side device, edge client, etc.) to ensure that vector features do not include confidential data or details allowing the network or cloud-based adversaries to uncover sensitive details. In some implementations, suggested DPLs can be published by a regulator or other trusted authority per given model. The higher the level of data security requirements, the higher the DPL of the shared vector features.

The MPL and DPL may be utilized in implementations of the disclosure for establishing performance adjustments boundaries. In some implementations, client side offload is implemented when DPL is less than or equal to (<=) MPL (or RMPL). Conversely, when DPL is greater than MPL, client side offload may not be implemented in some implementations.

When DPL is equal to (==) MPL, the offload partition as well as vector features are fixed. In cases when DPL is less than (<) MPL (e.g., MPL–DPL=5) there may be several (e.g., 5) options for offloading. In this case, the cloud side may query the client side about the client-side performance capabilities, such as CPU/GPU type and clock frequency, available dedicated DNN accelerators, etc. Accepted information can be used in client performance scoring and dynamically generated decision about determining the optimal split.

In one implementation, the client-side device (e.g., edge client, client, etc.) can generate a split layer (SPL) that can be used in model partition offload. In some implementations, the original model can have several pre-ready partitioned configurations covering the performance negotiation zone (e.g., covering edge client/server layers 304 of FIG. 3). After the SPL is determined, the server side system can select an appropriate model configuration and instantiate the hybrid inference architecture.

Figure 5A:
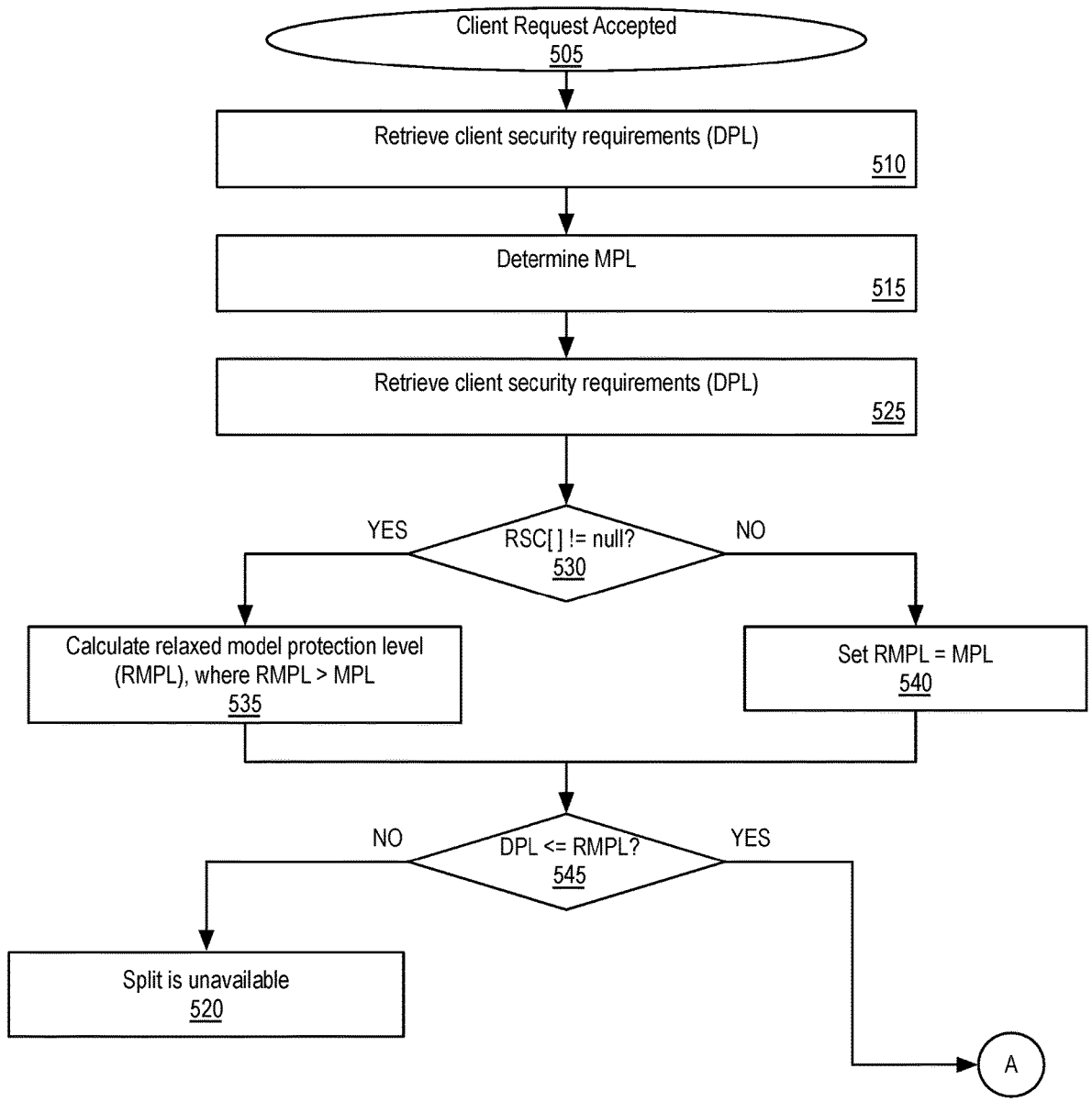
FIGS. 5A and 5B are flowcharts illustrating an example flow for dynamic NN distribution for security optimization performed by a server system, in accordance with implementations of the disclosure.
Figure 5B:
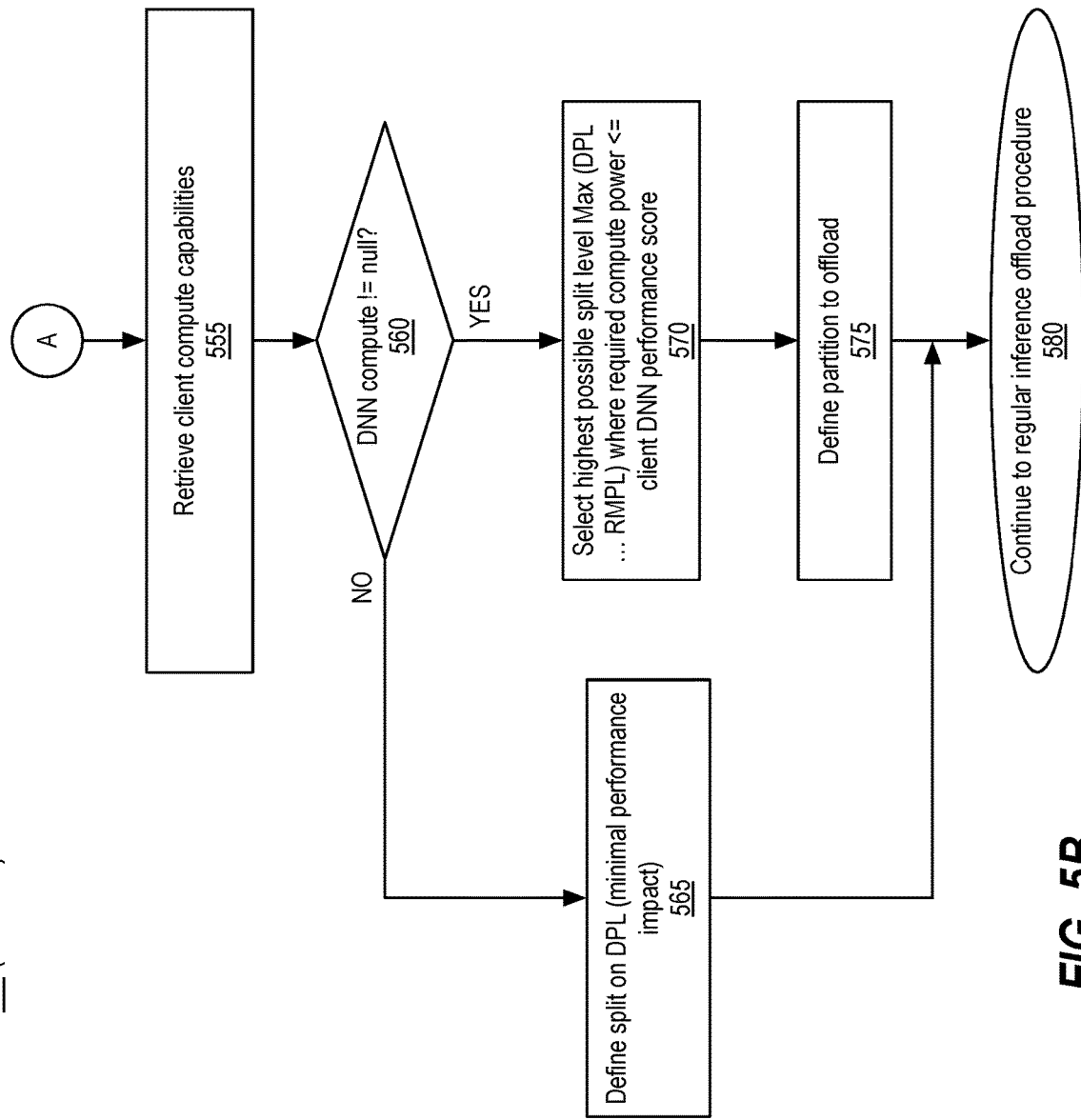

FIGS. 5A and 5B are flowcharts illustrating an example flow 500 for dynamic NN distribution for security optimization performed by a server system, in accordance with implementations of the disclosure. The various operations of the flow may be performed by any suitable circuitry, such as a controller of a host computing device, a controller of a memory module, or other components of a computing device. The example flow 500 may be representative of some or all the operations that may be executed by or implemented on one or more components of computing device 100 of FIG. 1, such as a dynamic NN distribution component 110. In some implementations, flow 500 may also be referred to as a process 500. The embodiments are not limited in this context.

At block 505, the process 500 may accept a client request to start a model session, the model being part of a NN architecture. At block 510, the process 500 may retrieve client security requirements. In one implementation, the client security requirements can be the DPL corresponding to the client. At block 515, the process 500 may determine the value of the MPL. Then flow 500 proceeds to block 525 to retrieve the client data security capabilities. In one implementation, the client data security capabilities that are retrieved include the RSCi described above.

At decision block 530, the process 500 may determine whether any of the RSCi's are not equal to null. If so, flow 500 proceeds to block 535 where the process 500 may calculate a relaxed MPL (RMPL), where the RMPL is greater than the MPL. Otherwise, at block 540, the process may set the RMPL to be equal to the determined MPL. Both blocks 535 and 540 proceed to decision block 545. At this decision block 545, process 500 checks whether the DPL is less than or equal to the RMPL. If not (e.g., DPL>RMPL), the process 500 proceeds to block 520, where the process 500 determines that the split (e.g., offload distributed NN partitioning) is unavailable. On the other hand, if the DPL is less than or equal to the RMPL, then process 500 proceeds to block 555 of FIG. 5B.

It should be understood that the terms MPL, DPL, RMPL and RSCi may not only refer to single scalar values, but may also refer to vectors or matrices, comprising a plurality of values. In some embodiments, for example, MLP may not be a single dividing threshold determining a split between the layers of a network but may denote a plurality of regions of layer indexes, where all layers inside the index regions are considered as containing information sensitive to the CSP. Similarly, the comparison operator "<=" that appears at block 545 of FIG. 5A should not only denote the integer comparison between scalar values DPL and RMPL, but also may denote a polynomial time algorithm which runs in the dynamic NN distribution component, accepts as input vector or matrix representations of the DPL and RMPL, performs a computation on these representations, and returns one of YES or NO.

At block 555 of FIG. 5B, the processor may retrieve the compute capabilities of the client. Then, at decision block 560, the processor determine whether any of the retrieved compute capabilities are not equal to null. If so, then flow 500 proceeds to block 570 where the processor may select a highest possible split level defined as Max(DPL . . . RMPL), where the compute power is less than or equal to the client's DNN performance score. Then, at block 575, the processor may define the partition to offload based on the selected split level of block 570. Flow 500 then proceeds to block 580 where the processor may continue to a regular inference offload procedure.

If, at decision block 560, the processor determines that the DNN compute capabilities are equal to null, then flow 500 proceeds to block 565, where the processor may define the partition to offload based on the DPL (e.g., minimal performance impact). Flow 500 then proceeds to block 580 where, as discussed above, the processor may continue to a regular inference offload procedure.

Some of the operations illustrated in FIGS. 5A and 5B may be repeated, combined, modified or deleted where appropriate, and additional steps may also be added to the flow in various embodiments. Additionally, steps may be performed in any suitable order without departing from the scope of particular embodiments.

FIG. 5C is a flowchart illustrating an example flow 590 for dynamic NN distribution for security optimization performed by a server system, in accordance with implementations of the disclosure. The various operations of the flow may be performed by any suitable circuitry, such as a controller of a host computing device, a controller of a memory module, or other components of a computing device. The example flow 590 may be representative of some or all the operations that may be executed by or implemented on one or more components of computing device 100 of FIG. 1, such as a dynamic NN distribution component 110. The embodiments are not limited in this context.

At block 592, the processor may determine security capabilities and compute capabilities of a client machine requesting to use a machine learning (ML) model hosted by the apparatus. At block 594, the processor may determine, based on the security capabilities and based on exposure criteria of the ML model, that one or more layers of the ML model can be offloaded to the client machine for processing.

Subsequently, at block 596, the processor may define, based on the compute capabilities of the client machine, a split level of the one or more layers of the ML model for partition of the ML model, the partition comprising offload layers of the one or more layers of the ML model to be processed at the client machine. Lastly, at block 598, the processor may cause the offload layers of the ML model to be downloaded to the client machine.

Some of the operations illustrated in FIG. 5C may be repeated, combined, modified or deleted where appropriate, and additional steps may also be added to the flow in various embodiments. Additionally, steps may be performed in any suitable order without departing from the scope of particular embodiments.

Figure 6:
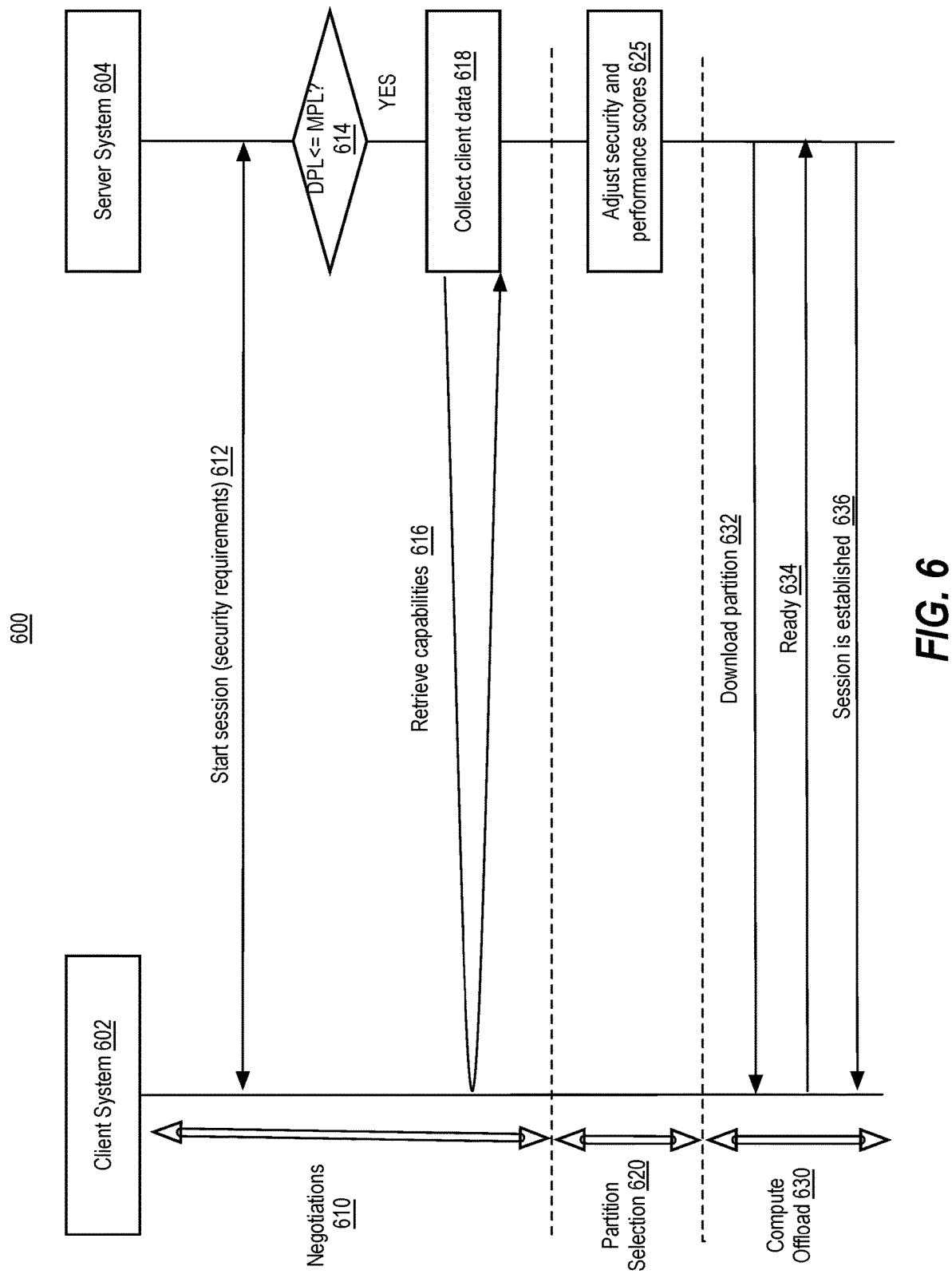
FIG. 6 illustrates a schematic depicting an example communication flow between a client system and server system to implement security optimizing compute distribution in a hybrid deep learning environment, in accordance with implementations of the disclosure.

FIG. 6 illustrates a schematic depicting an example communication flow 600 between a client system 602 and server system 604 to implement security optimizing compute distribution in a hybrid deep learning environment, in accordance with implementations of the disclosure. One or more of client system 602 and/or server system 604 may be the same as computing device 100 described with respect to FIGS. 1 and 2. Flow 600 depicts a high-level depiction of flow of communications between client system 602 and server system 604 to provide for dynamic NN distribution of payload of a model (e.g., ML model) between the client system 602 and server system 604. In one implementation, NN architecture 300 described with respect to FIG. 3 may be distributed between client system 602 and server system 604 using the flow 600 depicted in FIG. 6.

Flow 600 depicts three phases 610, 620, 630 of the dynamic NN distribution described herein. The first phase is a negotiation phase 610, the second phase is a partition selection phase 620, and the third phase is a compute offload phase 630. In the negotiation phase 610, the client system 602 starts the communication by originating a session start request at 612. The session start request may include exposed security requirements of the client system 602. Server system 604 may then evaluate the client system's requirements and internal model exposure criteria at decision block 614. For example, the server system 604 may determine whether the DPL is less than or equal to the MPL at 614. If so, the communications for dynamic NN distribution proceed with the server system 604 retrieving the client system's 602 compute capabilities at 616 and 618.

The partition selection phase 620 then proceeds at 625 with the server system 604 adjusting the security and performance scores in order to calculate the optimal offload partitioning.

The compute offload phase 630 then proceeds after the partitioning is selected. During the compute offload phase 630 the selected partition is downloaded to the client system 602 at 632. On the client system 602, a notification about readiness to pre-process inputs is sent at 634. The server system 604 then establishes the session at 636 by activating a vector features receiving pipe and notifying the client system 602 about readiness to process queries end-to-end.

Figure 7:
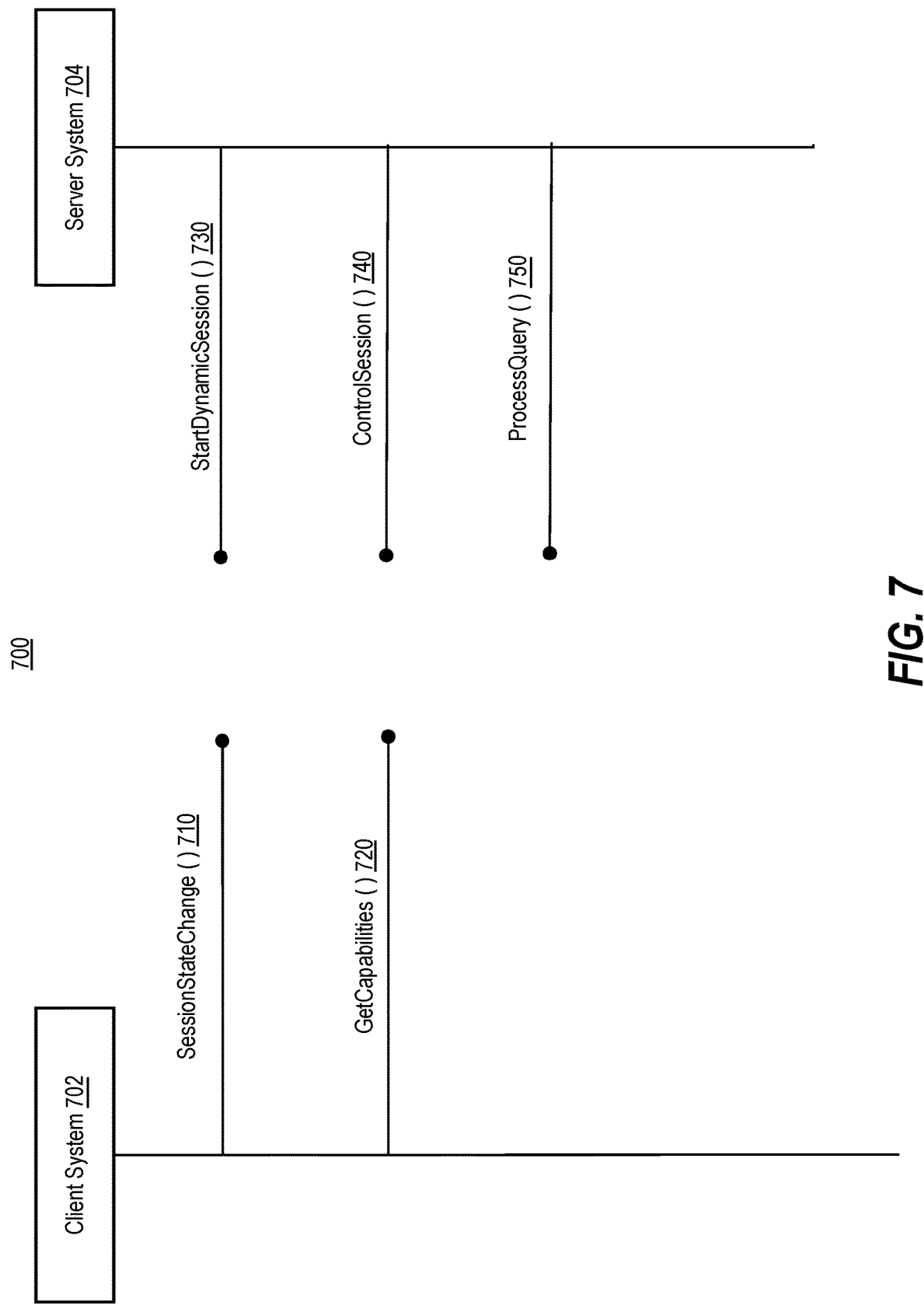
FIG. 7 illustrates a schematic depicting an example interfaces between a client system and server system to implement security optimizing compute distribution in a hybrid deep learning environment, in accordance with implementations of the disclosure.

FIG. 7 illustrates a schematic depicting an example interfaces 700 between a client system 702 and server system 704 to implement security optimizing compute distribution in a hybrid deep learning environment, in accordance with implementations of the disclosure. One or more of client system 702 and/or server system 704 may be the same as computing device 100 described with respect to FIGS. 1 and 2. Interfaces 700 depicts a high-level depiction of interfaces, such as APIs, used to communicate between client system 702 and server system 704 to provide for dynamic NN distribution of payload of a model (e.g., ML model) between the client system 702 and server system 704. In one implementation, NN architecture 300 described with respect to FIG. 3 may be distributed between client system 702 and server system 704 using the interfaces 700 depicted in FIG. 7.

In one implementation, the server system 704 can support session initiation 730 and control 740 APIs. The session initiation API 730 can be used for creating a session with split of DNN partitions between the client system 702 and the server system 704. In particular, the session initiation API 730 can be defined as follows: ClientPartition StartDynamicSession (ClientSecurityRequirements [ClientComputeCapabilities]). In a call, the client system 702 should provide the server system 704 the information utilized for making the decision regarding optimal model partitioning, such as client security requirements (e.g., including at least DPL) and optional information about the ML accelerators, etc., as well as the security controls assisting in partition run that are available on the client system 702. Trust may be established using a pre-defined authentication model, such as PKI certificate.

Alternatively, the client system 702 can support pulling of the mentioned parameters by the server system 704 through a GetCapabilities ( ) API 720. In response, the client system 702 can obtain DNN partition to run or an error code if a hybrid runtime cannot be supported.

In one implementation, the ControlSession( ) API 740 and the SessionStateChange( ) API 710 can be used by the client system 702 and the server system 704 correspondingly to let know each other about local decision of session pause, resume, abort, etc., complemented by appropriate information reporting session results, statistics, and so on. The ProcessQuery ( ) API 750 can be used by the server system 704 to process a query corresponding to the dynamic NN distribution of the partition. In one implementation, the described APIs 710-750 are used to illustrate one possible implementation. However, implementations of the disclosure may utilize other solutions relying on REST, SOAP, and so on. Furthermore, other implementations may be stateless, stateful, etc.

Independent Training of Layers of Distributed Deep Neural Networks

Many of the modern ML and DL solutions, with inference in mind, are built to process client inputs in the cloud. While being popular, the mentioned schemes are associated with accuracy, security and privacy issues. Specifically, generic cognition functions developed by CSPs and trained using big data may not exhibit accuracy in some specific client environments or client use cases. Furthermore, pushing content to the cloud may put the information contained in the input at the risk of being disclosed. Disclosure may happen to adversaries in the network or in the cloud. On the other hand, CSPs may not be ready to put their models (IPs) on third parties, such as clients, as such systems are potentially open for IP theft. This is one of the main drawbacks of federated learning approaches. In addition, clients might have resource constraints that do not allow running some AI payloads altogether.

The above-noted accuracy and security issues may either become a barrier for some solutions or force some solution owners to implement solutions with severe accuracy or security compromises. Implementations of the disclosure propose a solution that solves this problem by training cognition functions (e.g., visual, or audio-based reasoning) in a novel way that is different from Federated Learning, called Distributed Deep Learning (DDL). Implementations of the disclosure are focused on such training procedures supporting hybrid client and cloud inference.

Implementations of the disclosure pre-process and/or post-process information (i.e., execute parts of the model such as the convolutions and the first hidden layers) in the environments of clients, so that clients and servers do not reveal to each other either their training data or the layers and build through training. On the other hand, the layers trained by CSPs can serve as a common computing core to a plurality of client-specific ML services, which run in a distributed fashion in both client machines and the cloud service provider machines. In one implementations, the client-specific ML services may run in the distributed fashion in accordance with the techniques discussed above in relation to the dynamic NN distribution for security optimization, for example with respect to FIGS. 3-7 described above.

In one implementation, at training time, a server side processes back propagating gradients delivered by clients and either completes the back propagation process or returns processed gradients back to clients. At inference time, the server side processes the vector features delivered by clients and returns intermediate state vectors, or classification results. As a result, training is client-specific, while at the same time using the services of generic large DNN cores developed by servers. At the same time, sensitive details do not leave the clients (e.g., information is highly obfuscated) or the servers, which brings back the security levels acceptable levels.

In implementations of the disclosure, a novel mechanism for distributed deep learning training is provided where: (i) large parts of the network, developed by CSPs are used during training as fixed deep neural network components, while at the same time accommodating the training of more custom client-specific machine learning services; (ii) back propagation flows update the weights of the client-specific parts of the deep learning systems while also flowing through the pre-trained layers and neurons of the cloud service provider; and (iii) prediction and scoring are performed by flows of signals that pass through both the neurons and layers of client-specific parts of deep neural networks, running in clients, as well as client-agnostic parts of deep neural networks running in separate environments and owned by cloud service providers.

To support the mentioned functionality the following principles should be applied: Clients should be advertising their capabilities related to training and running parts of the model (e.g. convolutions, first hidden layers, etc.); Servers should be able to discover client capabilities and download or make available parts of their models to clients; Models should support partitioning and should be able to run in both client and server environments; and Both clients and servers should support a unified API for cross platform communication.

Figures 8A, 8B:
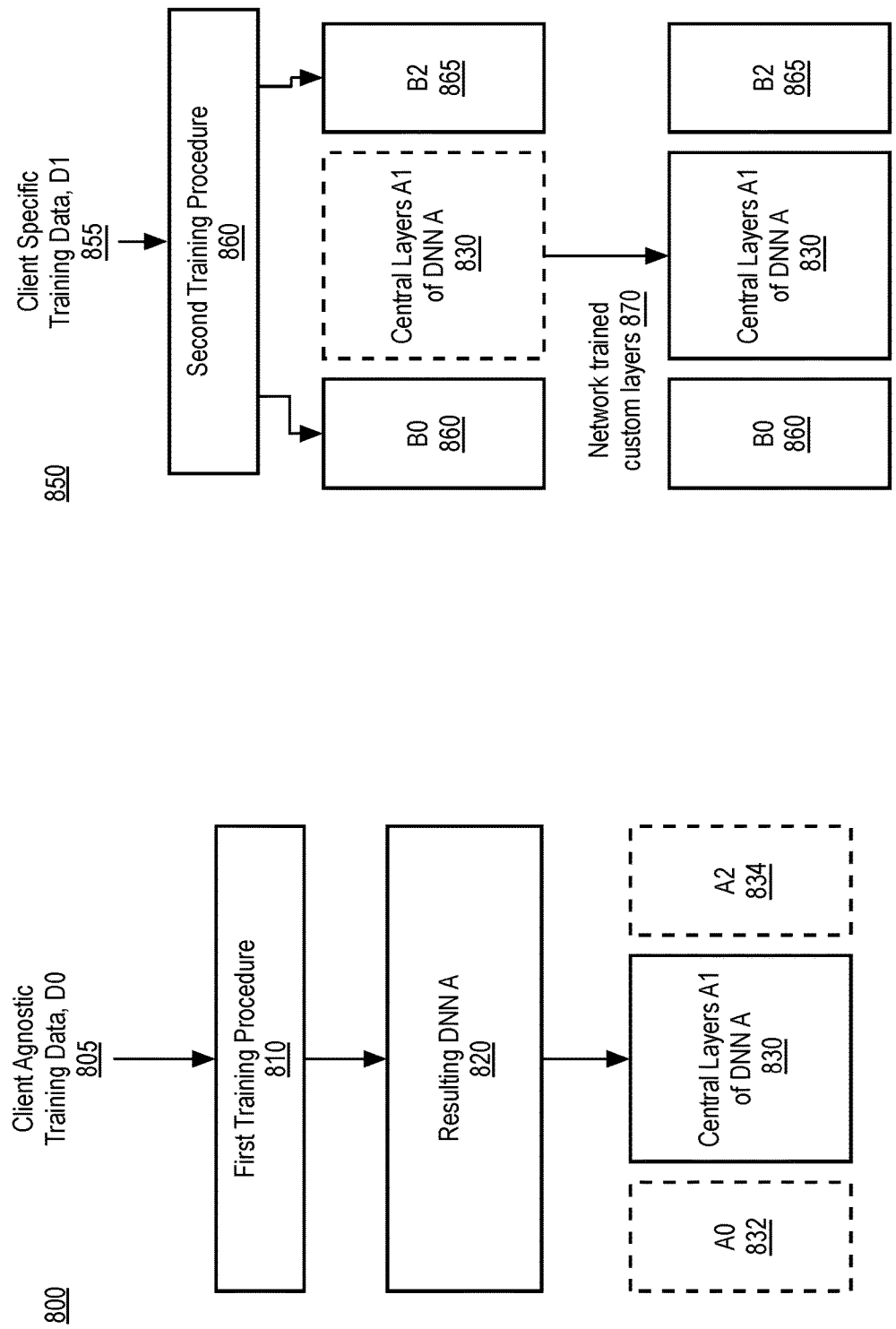
FIG. 8A illustrates an example flow of a first training procedure, which runs in the environment of a cloud service provider (CSP), in accordance with implementations of the disclosure.
FIG. 8B illustrates an example flow of a second training procedure, which runs in the environment of a client, in accordance with implementations of the disclosure.

FIG. 8A illustrates an example flow 800 of a first training procedure, which runs in the environment of a CSP, in accordance with implementations of the disclosure. The training procedure 810 of flow 800 accepts as input client-agnostic training data $D_0$ at 805. Such data $D_0$ may be large in volume, collected from multiple environments and associated with many different instances of a ML service. This training procedure 810 results in a trained network A 820. The CSP partitions the trained model into parts 830, 832, 834. As shown in FIG. 8A, network A is partitioned in three sets of neural layers $A_0$ 832, $A_1$ 830, and $A_2$ 834. Part $A_1$ 830 is the largest part of network A and is the one which is kept by the CSP and made available to clients. Part $A_1$ 830 is not sufficient by itself to support a ML service. It, however, may function as a general purpose cognition core, which can be part of a large number of client-specific machine learning services. Such services may be hybrid and may be running in both client and server environments.

The training of such a service is illustrated in FIG. 8B. FIG. 8B illustrates an example flow 850 of a second training procedure, which runs in the environment of a client, in accordance with implementations of the disclosure. The training of the figure uses the central part of network A, i.e., the layers $A_1$ 830 as is. The parts $A_0$ 832 and $A_2$ 834, which had been discarded in FIG. 8A, are now replaced by client specific layers $B_0$ 860 and $B_2$ 865. Layers $B_0$ 860 and $B_2$ 865 are updated using second training procedure 860 and run in the client, whereas layers $A_1$ 830 run in the cloud.

The training of FIG. 8B is a hybrid procedure that involves the exchange of messages between processes running in both clients and the cloud. In one implementation, a modified back propagation algorithm may be applied. This procedure may back propagate gradient information as the classical back propagation, but may leave the weights of the pre-trained part $A_1$ unmodified. On the other hand, this training procedure may train the client specific parts $B_0$ 860 and $B_2$ 865 to support a client-specific ML service with high accuracy. The training 860 accepts as input client specific data $D_1$ 855, which are collected and owned by the client. The training 860 updates the network parts residing in the client, and ensures that data $D_1$ 855 stay in the client for the whole duration of the training. Furthermore, the client-agnostic layers of $A_1$ 830 may be used for simultaneously training several client-specific services and layers (i.e., $C_0$ and $C_2$, $D_0$ and $D_2$ and so on). The result of the second training procedure 860 is network trained custom layers 870 including $B_0$ 860 and $B_2$ 865 as well as central layer $A_1$ 830.

Figure 9A:
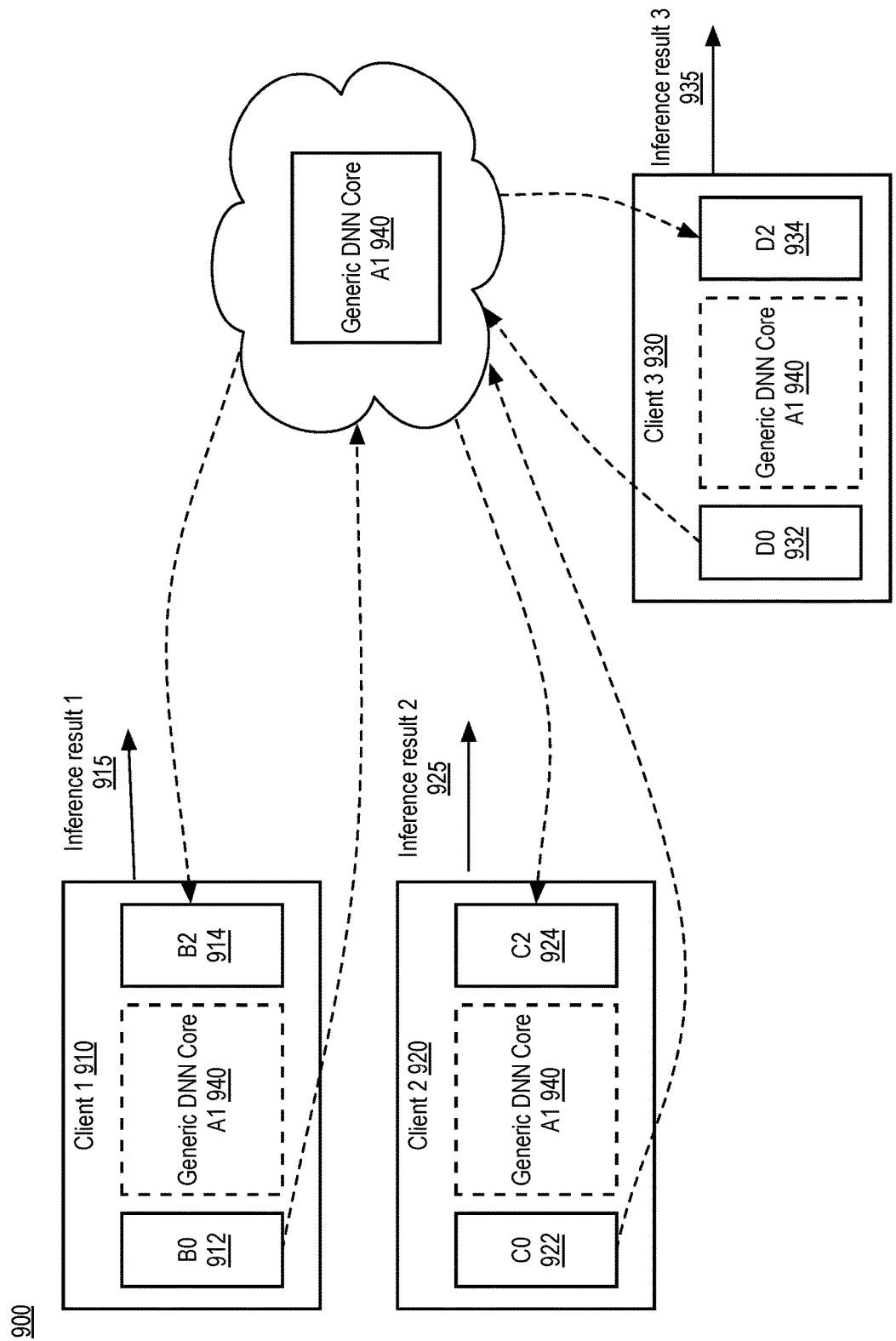
FIG. 9A illustrates a system for multiple client devices sharing the same deep neural network (DNN) computing core of a CSP during inference, in accordance with implementations of the disclosure.

FIG. 9A illustrates a system 900 for multiple client devices sharing the same DNN computing core of a CSP during inference, in accordance with implementations of the disclosure. System 900 depicts three different client devices 910, 920, 930, which may the same as computing device 100 described with respect to FIGS. 1 and 2. Client devices 910, 920, 930 may use the services of the same DNN computing core $A_1$ 940, which runs in the cloud. Client 1 910 runs a distributed DNN consisting of local layer sets $B_0$ 912 and $B_2$ 914, and the DNN core $A_1$ 940 shown in dashed lines. The the local layer sets $B_0$ 912 and $B_2$ 914 may run in the client. A placeholder for the core $A_1$ 940 is shown as a dashed box located between $B_0$ 912 and $B_2$ 914 in FIG. 9A. This placeholder refers to layers that do not run in the client, but are offered by the CSP.

In one implementation, inference is accomplished through the exchange of messages between client 1 910, and specifically the layer sets $B_0$ 912 and $B_2$ 914, and the DNN computing core $A_1$ 940. These messages propagate distributed NN state forward. Such state flows from the client input, to the layer set $B_0$ 912, to the DNN core $A_1$ 940, to the client layer set $B_2$ 914, finally producing inference output 915 at client 1 910.

Another client device, client 2 920 runs a similar distributed NN service. This service consists of two different local layer sets $C_0$ 922 and $C_2$ 924, which run in client 2 920, and the computing core $A_1$ 940. Client device 2 920 performs inference independently from client device 1 910 using a different distributed NN. The distributed NN of client 2 920 shares the DNN computing core 940 of client device 1 910, but is a different network as layer sets $C_0$ 922 and $C_2$ 924 are different from layer sets $B_0$ 912 and $B_2$ 914. Inference output 925 is produced at client 2 920. The same applies to client 3 930, which uses yet two other sets of local layers $D_0$ 932 and $D_2$ 934. Inference output 935 is produced at client 3 930.

Figure 9B:
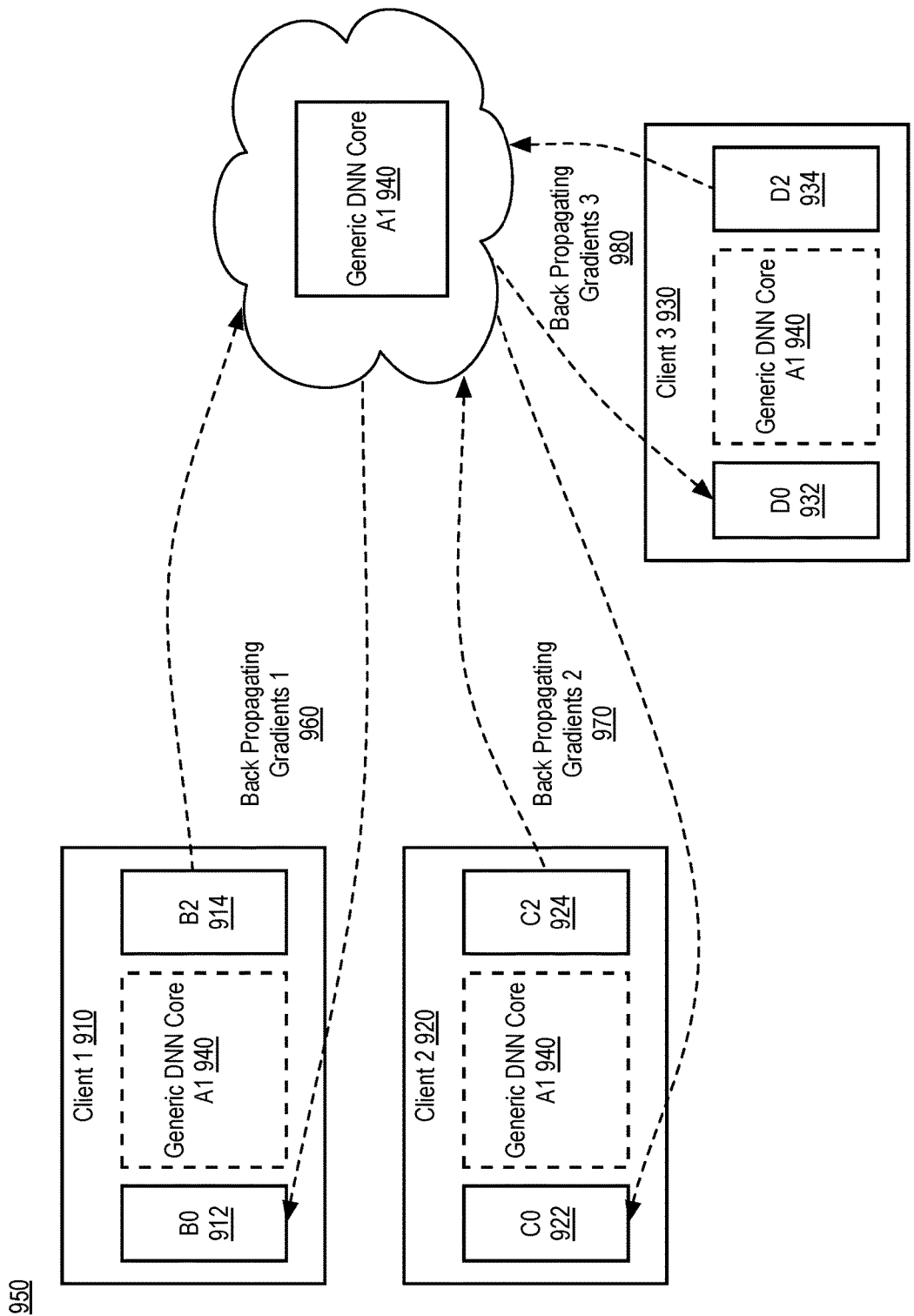
FIG. 9B illustrates a system for multiple client devices sharing the same DNN computing core of a CSP during training, in accordance with implementations of the disclosure.

FIG. 9B illustrates a system 950 for multiple client devices sharing the same DNN computing core of a CSP during training, in accordance with implementations of the disclosure. System 950 depicts three different client devices 910, 920, 930, which may the same as computing device 100 described with respect to FIGS. 1 and 2. FIG. 9B illustrates how the three devices of FIG. 9A train their local layer sets. Each of the three devices 910, 920, 930 perform independent training using the common layers of the computing core $A_1$ 940. Core $A_1$ 940 is pre-trained and fixed following the procedure of FIG. 8A, in one example. On the other hand, local layer sets $B_0$ 912, $B_2$ 914, $C_0$ 922, $C_2$ 924, $D_0$ 932, and $D_2$ 934, are formed through the back propagation of gradient flows 960, 970, 980, which pass through the computing core $A_1$ 940, without modifying the core 940.

The specifics of the procedure where parts of the original model are discarded in training involves flows of messages exchanged between clients and the cloud and back propagation is modified to leave the weights of the client-agnostic part of the model untouched are all new. Benefits from using implementations of the disclosure discussed may include, but are not limited to, improved video and audio-based cognition functions, improved security levels; improved performance as compared to "pure server side" ML models, reduced compute on the server side, as the client is doing what it can to share the load; and reduced network traffic in some cases where inference uses the client-specific parts.

Heterogeneous Distributed Deep Learning

Implementations of the disclosure may be utilized in the areas of federated and distributed deep learning. Deep learning services are expected to be supported by CSPs and offered to numerous client devices. Federated learning allows client devices and service providers to collaboratively build custom models without each sharing their training data with the other. Distributed deep learning is a deep learning methodology that supports stronger isolation between clients and service providers, allowing each party to keep their training data private as well as their contributions to the final model. Developing custom models through the collaboration of clients and service providers, and not just through big data driven, client-agnostic training procedure taking place at the cloud is an approach of implementations of the disclosure. Client, environment or application specific models tend to demonstrate better accuracy in a wide range of applications related to video and audio processing, for instance video analytics, surveillance, activity recognition and autonomous driving.

In one implementation, distributed deep learning can be advanced by implementing, not only the physical separation of the layers of a distributed DNN between clients and service providers, but also the deploying heterogeneous distributed DNN layers, where some layers may include standard convolutional neurons and other layers may include processing units performing domain-specific functions, such as edge detection, color extraction, texture detection, shape detection, and so on. Such processing units are known as "multifunction perceptrons". Conventional multifunction perceptron architecture may provide a training procedure that is based on counting the number or occurrences of features coming from multifunction perceptrons. Implementations of the disclosure provide a different way of training where multifunction perceptrons are combined with standard convolutional neurons and learning is supported by the back propagation process via flows of gradient information. In implementations of the disclosure, gradient information may flow through both standard convolutional neurons and multifunction perceptrons in a ubiquitous manner.

Implementations of the disclosure provide for the construction of heterogeneous distributed deep learning systems, where at least one of the layers of such systems includes at least one multifunction perceptron and another layer comprises a standard convolutional neuron, and where the layers of such systems are distributed between client devices and the compute infrastructure of cloud service providers. Learning in such systems may be accomplished by extending the back propagation algorithm to propagate gradient information not only through standard convolutional neurons but also through multifunction perceptrons. Multifunction perceptrons perform domain-specific processing on their inputs. In the domain of image and video processing, multifunction perceptrons may be performing edge detection, color feature extraction, shape detection, texture feature extraction and so on. Multifunction perceptrons may also be splitters or transformers.

In some implementations, the optimal split for the partition of the model described above with respect to FIGS. 3-7 may be defined in terms of the one or more stages of the multifunction perceptron architecture described herein. For example, the optimal split for the model may identify at least one stage of the model for offload to the client machine for at least one of training or inference of the model, where the stage is may implement a multifunction perceptron neuron as described herein.

Figure 10:
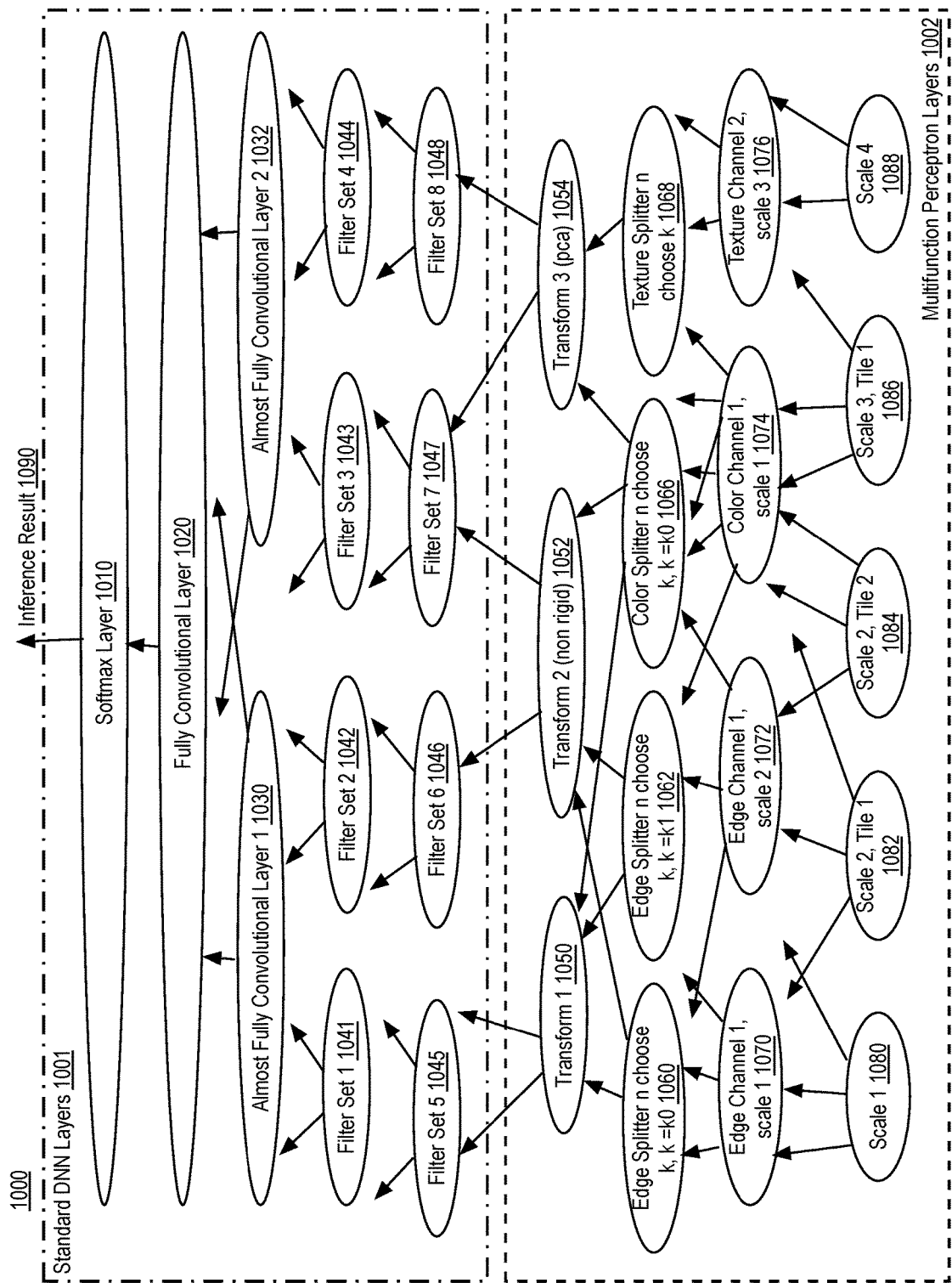
FIG. 10 illustrates a heterogeneous distributed deep learning network providing heterogeneous distributed deep leaning in the context of visual content processing, in accordance with implementations of the disclosure.

FIG. 10 illustrates a heterogeneous distributed deep learning network 1000 providing heterogeneous distributed deep leaning in the context of visual content processing, in accordance with implementations of the disclosure. Heterogeneous distributed deep learning network 1000 may also be referred to as network 1000 herein. Network 1000 provide an architecture where some neurons are performing computations from a broader selection of compute functions, other than just convolutions. Moreover, functions are domain-specific in order to keep the problem and solution tractable. In some implementations, class features are learned dynamically using back propagation as in standard DNNs.

For example, network 1000 may include standard DNN layers 1001. Standard DNN layers 1001 may include (without limitation) softmax layer 1010 (which generates inference result 1090), fully convolutional layer 1020, almost fully convolutional layers 1030, 1032, and filter sets 1041-1048. Network 1000 may also include multifunction perceptron layers 1002. Multifunction perceptron layers 1002 may include (without limitation) transformer neurons 1050, 1052, 1054, splitter neurons including edge splitters 1060, 1062, color splitter 1066, and texture splitter 1068, extractor neurons include edge extractors 1070, 1072, color extractor 1074, and texture extractor 1076, and selector neurons 1080, 1082, 1084, 1086, 1088. Further details of the multifunction perceptron layer 1002 neurons is provided below.

One class of multifunction perceptrons selects subsets of the input image. These are "selector" neurons (e.g., neurons 1080-1088). Image pyramid computations, for example, which compute a scale space representation of an image, can be supported by these neurons 1080-1088.

A second class of multifunction perceptrons split an image into tiles. A second class of multifunction perceptrons computes 'raw' visual features from the outputs of the selector neurons. These are "extractor" neurons (e.g., extractor neurons 1070-1076). Extractor neurons 1070-1076 can for example support versatile edge detection. Edges can be computed on various channels, at various visual scales and using various adaptable thresholds. Similarly, color patterns can be computed from various channels, using various thresholds and implementing various modeling techniques. Texture pattern detection can also be supported by these neurons.

A third class of multifunction perceptrons operate on the outputs of the extractor neurons. Such neurons partition the raw features computed by the extractor neurons into components. The motivation for having this class of neurons is that class salient features may be present in parts of the output of the extractors and not in their whole output. For example, the edge information associated with a car's wheels may be combined with other irrelevant background edge information. The relevant information can be isolated by these neurons. This class of neurons may be referred to as "splitter" neurons (e.g., 1060-1068). For example, splitter neurons 1060-1068 can implement an n-choose-k splitting technique for various values of k.

A fourth class of neurons implement further transformations on the raw feature components returned by the splitter neurons. This class of neurons may be referred to as "transformer" neurons (e.g., 1050-1054). Transformer neurons 1050-1054 can support several different visual transforms including rigid transforms, non-rigid transforms, dimensionality reduction, lighting and contrast adjustments, and so on.

As noted above, multifunction perceptrons of the multifunction perceptron layer 1002 are followed or may be interrupted by layers of standard convolutional neurons 1001. Convolutional neurons may be organized into filter maps 1041-0148 as in common DNN architectures, followed by activation functions such Restricted Linear Units (ReLUs) or feeding their outputs into max pulling stages. Furthermore, some layers may be almost fully convolutional 1030-1032 or fully convolutional 1020.

Figure 11:
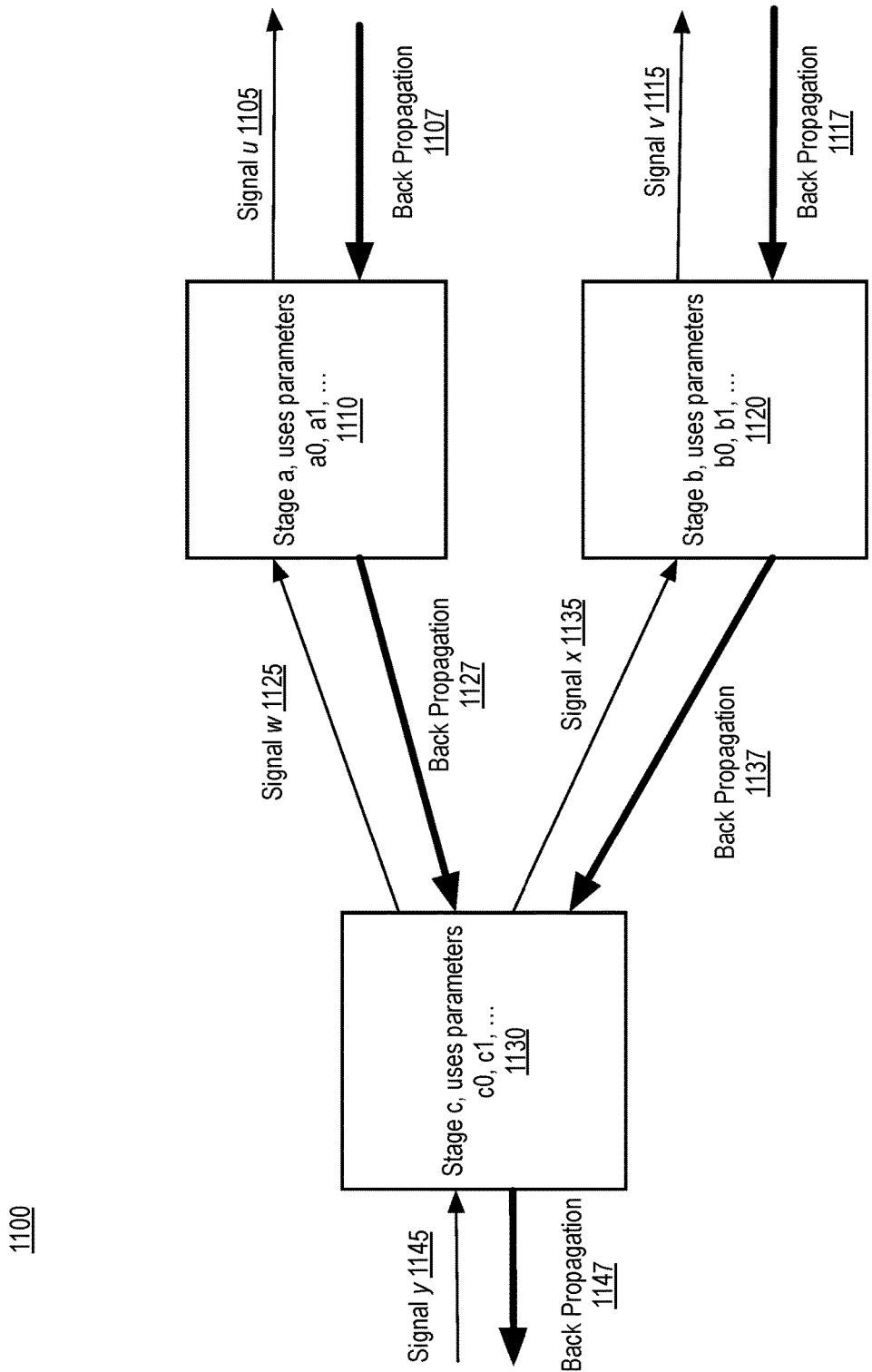
FIG. 11 illustrates a heterogeneous distributed deep learning network that performs a back propagation-based learning process, in accordance with implementations of the disclosure.

FIG. 11 illustrates a heterogeneous distributed deep learning network 1100 that performs a back propagation-based learning process, in accordance with implementations of the disclosure. In one implementations, heterogeneous distributed deep learning network 1100 may be one or more components of network 1000 described with respect to FIG. 10. Heterogeneous distributed deep learning network 1100 may also be referred to herein as network 1100.

In one implementation, back propagation in network 1100 can be performed across both standard convolutional neurons and multifunction perceptrons. Specifically, as signals u 1105 and v 1115 flow from the outputs of stages a 1110 and b 1120, respectively, toward the output of the network 1100, gradient components 1107 ($\partial\varepsilon/\partial u$) and 1117 ($\partial\varepsilon/\partial v$) flow backwards from the output of the network 1100 toward its input. The terms stages and neurons may be used interchangeably herein. Signal $\varepsilon$ may refer to the current cognition error at the output of the network. Stages a 1110 and b 1120 use these gradient components 1107, 1117 to adjust their parameters $a_0, a_1, \ldots$ and $b_0, b_1, \ldots$, as well as produce new gradient components 1127

$$\left(\frac{\partial\varepsilon}{\partial w}, \text{where } \frac{\partial\varepsilon}{\partial w} = \frac{\partial\varepsilon}{\partial u} * \frac{\partial\varepsilon}{\partial w}\right)$$

and 1137

$$\left(\frac{\partial\varepsilon}{\partial x}, \text{where } \frac{\partial\varepsilon}{\partial x} = \frac{\partial\varepsilon}{\partial v} * \frac{\partial\varepsilon}{\partial x}\right)$$

associated their input signals w 1125 and x 1135. Gradient components 1127 ($\partial\varepsilon/\partial w$) and 1137 ($\partial\varepsilon/\partial x$) can be computed using the chain rule of differentiation.

In implementations of the disclosure, the gradient components 1127 ($\partial\varepsilon/\partial w$) and 1137 ($\partial\varepsilon/\partial x$) flow through at least one third stage c 1130, which is not a convolutional neuron but a multifunction perceptron, performing some domain specific task. Stage c 1130 may use the gradient components 1127 ($\partial\varepsilon/\partial w$) and 1137 ($\partial\varepsilon/\partial x$) to adjust its parameters $c_0$, $c_1, \ldots$ as stages a 1110 and b 1120 do. Parameters $c_0$, $c_1, \ldots$, however, may not be synaptic weights, but other domain specific parameters, including but not limited to edge detection filter parameters, Canny hysteresis parameters, color extraction thresholds, shape detection parameters, localized binary pattern parameters, and so on. Stage c 1130 can also back propagate the gradient component 1147

$$\left(\frac{\partial\varepsilon}{\partial y}, \text{where } \frac{\partial\varepsilon}{\partial y} = \frac{\partial\varepsilon}{\partial w} * \frac{\partial w}{\partial y} + \frac{\partial\varepsilon}{\partial x} * \frac{\partial x}{\partial y}\right)$$

to other multifunction perceptrons.

Figure 12:
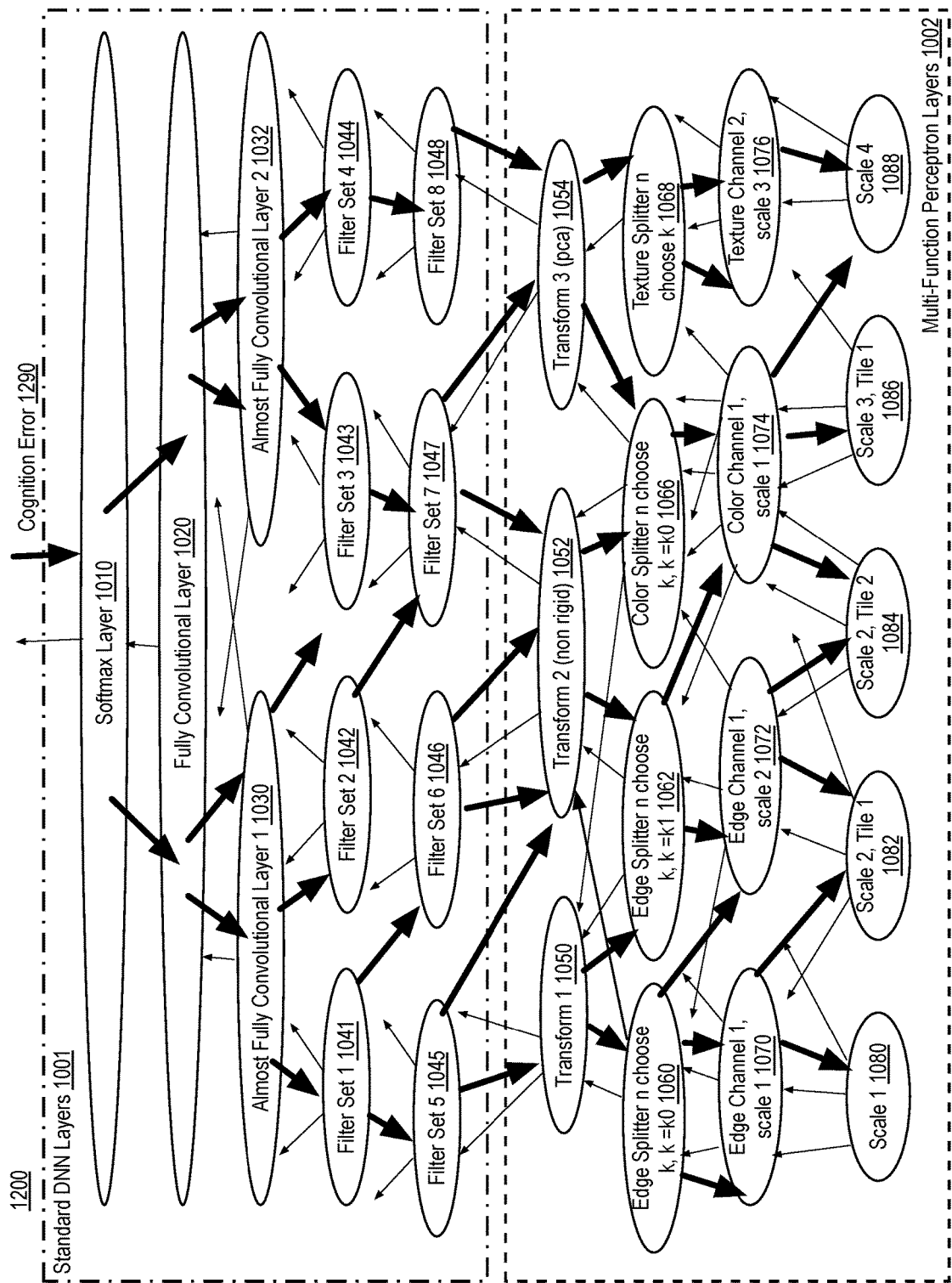
FIG. 12 illustrates a heterogeneous distributed deep learning network 1200 providing back propagation in training, in accordance with implementations of the disclosure.

Back propagation at a larger scale, as performed by the heterogeneous deep learning architecture described herein is further illustrated in FIG. 12. FIG. 12 illustrates a heterogeneous distributed deep learning network 1200 providing back propagation in training, in accordance with implementations of the disclosure. Heterogeneous distributed deep learning network 1200 may also be referred to as network 1200 herein. In one implementation, network 1200 is the same as network 1000 described with respect to FIG. 10, and many of the components of network 1000 are included in network 1200. For brevity, many of the details already discussed with reference to FIG. 10 apply similar herein and are not repeated or discussed hereafter.

Network 1200 shows the same heterogeneous deep learning architecture of network 1000 of FIG. 10, further annotating the back propagation flows. Annotated back propagation flows are shown in red color. Cognition error 1290 may cause back propagation flows that pass seamlessly through both convolutional neurons as well as multifunction perceptrons following the paths that are formed by the synapses of the neural network topology of network 1200. It may be assumed that the multifunction perceptrons which are being trained using implementations of the disclosure are either differentiable with respect to the parameters this procedure adjusts, or can be approximated by, differentiable components.

Figure 13:
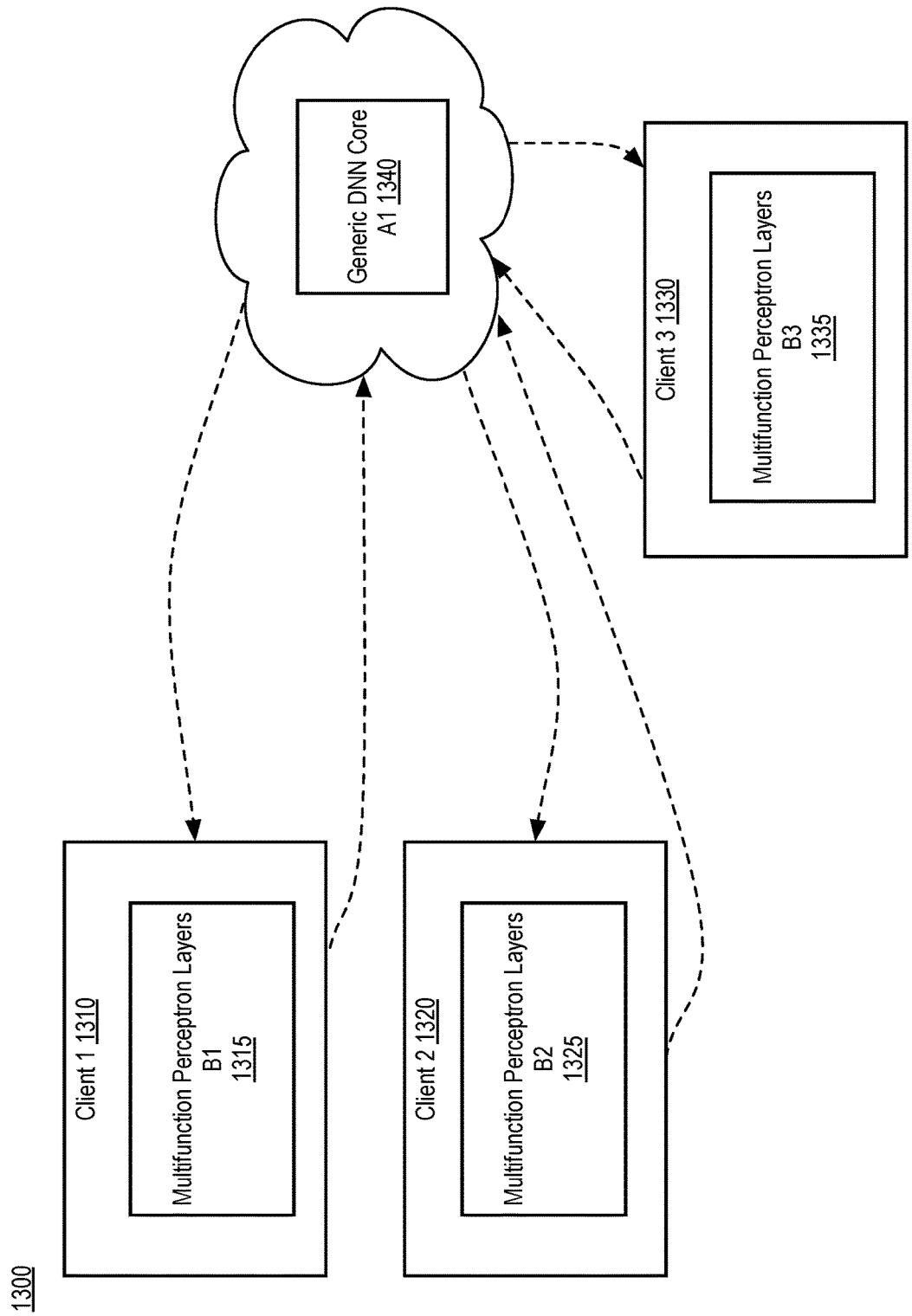
FIG. 13 illustrates a system for multiple client devices supporting corresponding heterogenous distributed NN and sharing the same DNN computing core of a CSP during inference, in accordance with implementations of the disclosure.

FIG. 13 illustrates a system 1300 for multiple client devices supporting corresponding heterogenous distributed NN and sharing the same DNN computing core of a CSP during inference, in accordance with implementations of the disclosure. In system 1300, three distributed heterogeneous deep NNs 1315, 1325, 1335 are provide by client devices 1310, 1320, 1330, where these networks 1315, 1325, 1335 share a common DNN core 1340 running at a CSP. The networks 1315, 1325, 1335 can include the core 1340, as well as layers of multifunction perceptrons running at client devices 1 1310, 2 1320, and 3 1330, respectively. In one implementation, the computing core $A_1$ 1340 is trained first, using large amounts of client device-agnostic data, and independently of the client devices 1 1310, 2 1320, and 3 1330. Subsequently, the layers 1315, 1325, 1335 running at devices 1 1310, 2 1320, and 3 1330 adjust their parameters using the procedures described above with respect to FIGS. 11 and 12.

In some implementations, neurons in the above-described heterogenous distributed NN architecture may be software processes or threads running in a plurality of processors that can be homogeneous or heterogeneous. Alternatively, neurons may be implemented as hardware threads or by means of sequential logic as part of custom ASIC architectures. Connectivity between neurons can be realized by a plurality of interconnects or buses, connecting the processors where neurons run. A logical graph describing a heterogeneous deep learning architecture may be mapped to a physical graph, consisting of available processors and interconnects, where each logical link may be mapped to a physical link and each neuron may be mapped to a physical processor or custom ASIC. Processors can be regular processing cores of client or server systems (e.g., laptops, desktop PCs, cloud servers), low power cores, or tiny cores with sufficient computing resources to just run the functions which the neurons support (e.g., edge detection, color detection). For example, a multifunction perceptron architecture may run in a general purpose server computer, consisting of eight sockets, each supporting 16 cores and 32 threads, and a memory hierarchy consisting of per core L1, per core L2, shared L3, and external DDR memory units. Alternatively, the multifunction perceptron architecture may run on an array of tiny cores, consisting of 16K tiny cores, where each tiny core may support a limited instruction set to run the perceptron functions, a small local scratchpad memory (e.g., 128K bytes scratchpad) and a plurality of interconnects to communicate with other tiny cores.

Figure 14:
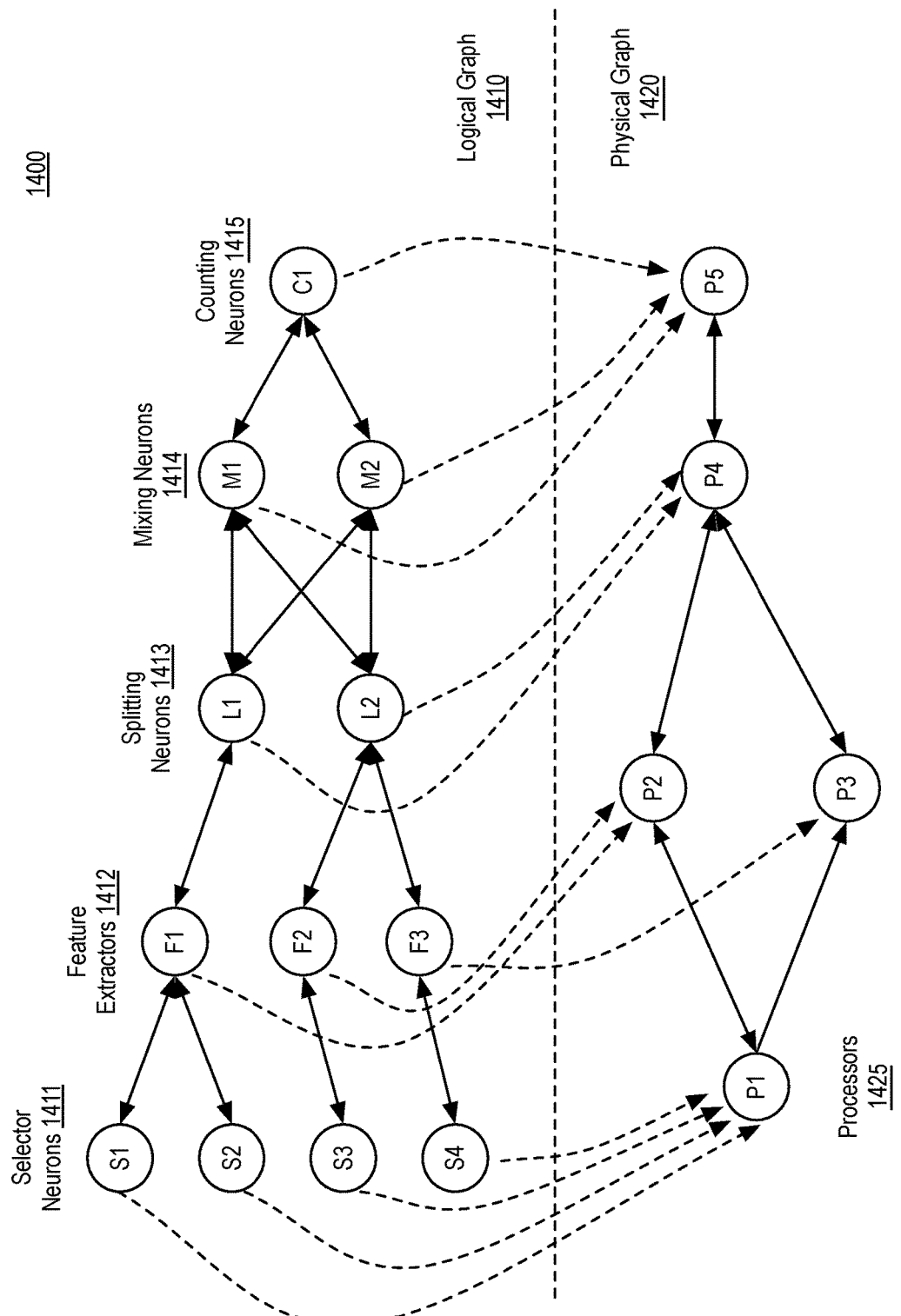
FIG. 14 illustrates a mapping between a logical and a physical graph describing a heterogeneous deep learning architecture, in accordance with implementations of the disclosure.

FIG. 14 illustrates a mapping 1400 between a logical and a physical graph describing a heterogeneous deep learning architecture, in accordance with implementations of the disclosure. Mapping 1400 depicts a logical graph 1410 including four selector neurons $S_1$-$S_4$ 1411, three feature extractor neurons $F_1$-$F_3$ 1412, two splitting neurons $L_1$, $L_2$ 1413, two mixing neurons $M_1$, $M_2$ 14141, and a single counting neuron $C_1$ 1415. This logical graph 1410 is mapped to a physical graph 1420, which includes five processors $p_1$-$p_5$ 1425. The illustrated mapping 1400 places the logical nodes $S_1$-$S_4$ 1411, which are the selector neurons into the physical mode $p_1$. The mapping 1400 further places the extractor neurons $F_1$-$F_3$ 1412 into physical nodes $p_1$ and $p_3$. Finally, the mapping 1400 places the splitting neurons $L_1$, $L_2$ 1413 into the physical node $p_4$, and the mixing/counting neurons $M_1$, $M_2$ 1414, and $C_1$ 1415 into the physical node $p_5$. Mapping 1400 is one example of the correspondence between logical and physical graphs describing a heterogeneous deep learning architecture, and other mappings may also be possible in implementations of the disclosure.

The following examples pertain to further embodiments. Example 1 is an apparatus to facilitate security optimizing compute distribution in a hybrid deep learning environment. The apparatus of Example 1 comprises one or more processors to: determine security capabilities and compute capabilities of a client machine requesting to use a machine learning (ML) model hosted by the apparatus; determine, based on the security capabilities and based on exposure criteria of the ML model, that one or more layers of the ML model can be offloaded to the client machine for processing; define, based on the compute capabilities of the client machine, a split level of the one or more layers of the ML model for partition of the ML model, the partition comprising offload layers of the one or more layers of the ML model to be processed at the client machine; and cause the offload layers of the ML model to be downloaded to the client machine.

In Example 2, the subject matter of Example 1 can optionally include wherein the exposure criteria comprise identification of a model protection level (MPL) that is a lowest layer of the one or more layers of the ML model that can be offloaded to the client machine without exposing the ML model to a security risk, the lowest layer counted from a first input layer of the one or more layers of the ML model. In Example 3, the subject matter of any one of Examples 1-2 can optionally include wherein the one or more processors to determine that the one or more layers of the ML model can be offloaded further comprises the one or more processors to compare the exposure criteria to the security capabilities, wherein the security capabilities identify a data protection level (DPL) of the one or more layers that can run on the client machine to ensure that confidential data of the client machine is not exposed.

In Example 4, the subject matter of any one of Examples 1-3 can optionally include wherein offload of the one or more layers to the client machine is allowed in response to the DPL being less than or equal to the MPL. In Example 5, the subject matter of any one of Examples 1-4 can optionally include wherein the one or more processors to define the split level further comprises the one or more processors to identify the split level based on a level of compute power used to run a subset of the one or more layers defined by the split level being less than or equal to a compute power defined in the compute capabilities of the client machine.

In Example 6, the subject matter of any one of Examples 1-5 can optionally include wherein the one or more layers of the ML model further comprise a set of client machine layers that are trained by the client machine and are run by the client machine, where client machine layers at least one of replace the offload layers of the ML model or are run in addition to the offload layers of the ML model. In Example 7, the subject matter of any one of Examples 1-6 can optionally include wherein training of the client machine layers of the ML model comprises back-propagating vectors to adjust first weights in the client machine layers without adjusting second weights in a common computing core of the ML model.

In Example 8, the subject matter of any one of Examples 1-7 can optionally include wherein an inference stage of the ML model utilizes the client machine layers and the common computing core of the ML model, and wherein an inference signal is generated by processed by starting processing at the client machine layers, proceeding to processing at the common computing core, and returning to processing at the client machine layers to provide an inference result.

In Example 9, the subject matter of any one of Examples 1-8 can optionally include wherein the one or more layers of the ML model comprise one or more stages of a multifunction perceptron architecture having a plurality of neurons to perform one or more neuron functions of the ML model, and wherein the plurality of neurons comprise heterogenous neurons including one or more of splitter neurons, mixer neurons, counter neurons, selector neurons, extractor neurons, or transformer neurons. In Example 10, the subject matter of any one of Examples 1-9 can optionally include wherein the split level for the partition of the ML model is defined in terms of the one or more stages of the multifunction perceptron architecture and identifies at least one stage of the ML model for offload to the client machine for at least one of training or inference of the ML model. In Example 11, the subject matter of any one of Examples 1-10 can optionally include wherein the one or more processors comprise one or more of a graphics processor, an application processor, and another processor, wherein the one or more processors are co-located on a common semiconductor package.

Example 12 is a non-transitory machine readable storage medium for facilitating security optimizing compute distribution in a hybrid deep learning environment. The non-transitory machine readable storage medium of Example 12 having stored thereon executable computer program instructions that, when executed by one or more processors, cause the one or more processors to perform operations comprising: determining security capabilities and compute capabilities of a client machine requesting to use a machine learning (ML) model; determining, based on the security capabilities and based on exposure criteria of the ML model, that one or more layers of the ML model can be offloaded to the client machine for processing; defining, based on the compute capabilities of the client machine, a split level of the one or more layers of the ML model for partition of the ML model, the partition comprising offload layers of the one or more layers of the ML model to be processed at the client machine; and causing the offload layers of the ML model to be downloaded to the client machine.

In Example 13, the subject matter of Example 12 can optionally include wherein the exposure criteria comprise identification of a model protection level (MPL) that is a lowest layer of the one or more layers of the ML model that can be offloaded to the client machine without exposing the ML model to a security risk, the lowest layer counted from a first input layer of the one or more layers of the ML model, and wherein the operations further comprising determining that the one or more layers of the ML model can be offloaded further comprises the one or more processors to compare the exposure criteria to the security capabilities, wherein the security capabilities identify a data protection level (DPL) of the one or more layers that can run on the client machine to ensure that confidential data of the client machine is not exposed.

In Example 14, the subject matter of Examples 12-13 can optionally include wherein the one or more layers of the ML model further comprise a set of client machine layers that are trained by the client machine and are run by the client machine, where client machine layers at least one of replace the offload layers of the ML model or are run in addition to the offload layers of the ML model, and training of the client machine layers of the ML model comprises back-propagating vectors to adjust first weights in the client machine layers without adjusting second weights in a common computing core of the ML model.

In Example 15, the subject matter of Examples 12-14 can optionally include wherein an inference stage of the ML model utilizes the client machine layers and the common computing core of the ML model, and wherein an inference signal is generated by processed by starting processing at the client machine layers, proceeding to processing at the common computing core, and returning to processing at the client machine layers to provide an inference result.

In Example 16, the subject matter of Examples 12-15 can optionally include wherein the one or more layers of the ML model comprise one or more stages of a multifunction perceptron architecture having a plurality of neurons to perform one or more neuron functions of the ML model, and wherein the split level for the partition of the ML model is defined in terms of the one or more stages of the multifunction perceptron architecture and identifies at least one stage of the ML model for offload to the client machine for at least one of training or inference of the ML model.

Example 17 is a method for facilitating security optimizing compute distribution in a hybrid deep learning environment. The method of Example 17 can include determining security capabilities and compute capabilities of a client machine requesting to use a machine learning (ML) model; determining, based on the security capabilities and based on exposure criteria of the ML model, that one or more layers of the ML model can be offloaded to the client machine for processing; defining, based on the compute capabilities of the client machine, a split level of the one or more layers of the ML model for partition of the ML model, the partition comprising offload layers of the one or more layers of the ML model to be processed at the client machine; and causing the offload layers of the ML model to be downloaded to the client machine.

In Example 18, the subject matter of Example 17 can optionally include wherein the exposure criteria comprise identification of a model protection level (MPL) that is a lowest layer of the one or more layers of the ML model that can be offloaded to the client machine without exposing the ML model to a security risk, the lowest layer counted from a first input layer of the one or more layers of the ML model, and wherein determining that the one or more layers of the ML model can be offloaded further comprises comparing the exposure criteria to the security capabilities, wherein the security capabilities identify a data protection level (DPL) of the one or more layers that can run on the client machine to ensure that confidential data of the client machine is not exposed.

In Example 19, the subject matter of any one of Examples 17-18 can optionally include wherein the one or more layers of the ML model further comprise a set of client machine layers that are trained by the client machine and are run by the client machine, where client machine layers at least one of replace the offload layers of the ML model or are run in addition to the offload layers of the ML model, and training of the client machine layers of the ML model comprises back-propagating vectors to adjust first weights in the client machine layers without adjusting second weights in a common computing core of the ML model.

In Example 20, the subject matter of any one of Examples 17-19 can optionally include wherein the one or more layers of the ML model comprise one or more stages of a multi-function perceptron architecture having a plurality of neurons to perform one or more neuron functions of the ML model, and wherein the split level for the partition of the ML model is defined in terms of the one or more stages of the multifunction perceptron architecture and identifies at least one stage of the ML model for offload to the client machine for at least one of training or inference of the ML model.

Example 21 is a system to facilitate security optimizing compute distribution in a hybrid deep learning environment. The system of Example 21 comprises a hardware accelerator to host a machine learning (ML) model; and one or more processors communicably coupled to the hardware accelerator. In Example 21, the one or more processors of the system are to: determine security capabilities and compute capabilities of a client machine requesting to use a machine learning (ML) model hosted by the apparatus; determine, based on the security capabilities and based on exposure criteria of the ML model, that one or more layers of the ML model can be offloaded to the client machine for processing; define, based on the compute capabilities of the client machine, a split level of the one or more layers of the ML model for partition of the ML model, the partition comprising offload layers of the one or more layers of the ML model to be processed at the client machine; and cause the offload layers of the ML model to be downloaded to the client machine.

In Example 22, the subject matter of Example 21 can optionally include wherein the exposure criteria comprise identification of a model protection level (MPL) that is a lowest layer of the one or more layers of the ML model that can be offloaded to the client machine without exposing the ML model to a security risk, the lowest layer counted from a first input layer of the one or more layers of the ML model. In Example 23, the subject matter of any one of Examples 21-22 can optionally include wherein the one or more processors to determine that the one or more layers of the ML model can be offloaded further comprises the one or more processors to compare the exposure criteria to the security capabilities, wherein the security capabilities identify a data protection level (DPL) of the one or more layers that can run on the client machine to ensure that confidential data of the client machine is not exposed.

In Example 24, the subject matter of any one of Examples 21-23 can optionally include wherein offload of the one or more layers to the client machine is allowed in response to the DPL being less than or equal to the MPL. In Example 25, the subject matter of any one of Examples 21-24 can optionally include wherein the one or more processors to define the split level further comprises the one or more processors to identify the split level based on a level of compute power used to run a subset of the one or more layers defined by the split level being less than or equal to a compute power defined in the compute capabilities of the client machine.

In Example 26, the subject matter of any one of Examples 21-25 can optionally include wherein the one or more layers of the ML model further comprise a set of client machine layers that are trained by the client machine and are run by the client machine, where client machine layers at least one of replace the offload layers of the ML model or are run in addition to the offload layers of the ML model. In Example 27, the subject matter of any one of Examples 21-26 can optionally include wherein training of the client machine layers of the ML model comprises back-propagating vectors to adjust first weights in the client machine layers without adjusting second weights in a common computing core of the ML model.

In Example 28, the subject matter of any one of Examples 21-27 can optionally include wherein an inference stage of the ML model utilizes the client machine layers and the common computing core of the ML model, and wherein an inference signal is generated by processed by starting processing at the client machine layers, proceeding to processing at the common computing core, and returning to processing at the client machine layers to provide an inference result.

In Example 29, the subject matter of any one of Examples 21-28 can optionally include wherein the one or more layers of the ML model comprise one or more stages of a multi-function perceptron architecture having a plurality of neurons to perform one or more neuron functions of the ML model, and wherein the plurality of neurons comprise heterogenous neurons including one or more of splitter neurons, mixer neurons, counter neurons, selector neurons, extractor neurons, or transformer neurons. In Example 30, the subject matter of any one of Examples 21-29 can optionally include wherein the split level for the partition of the ML model is defined in terms of the one or more stages of the multifunction perceptron architecture and identifies at least one stage of the ML model for offload to the client machine for at least one of training or inference of the ML model. In Example 31, the subject matter of any one of Examples 21-30 can optionally include wherein the one or more processors comprise one or more of a graphics processor, an application processor, and another processor, wherein the one or more processors are co-located on a common semiconductor package.

Example 32 is an apparatus for facilitating security optimizing compute distribution in a hybrid deep learning environment according to implementations of the disclosure. The apparatus of Example 32 can comprise means for determining security capabilities and compute capabilities of a client machine requesting to use a machine learning (ML) model; means for determining, based on the security capabilities and based on exposure criteria of the ML model, that one or more layers of the ML model can be offloaded to the client machine for processing; means for defining, based on the compute capabilities of the client machine, a split level of the one or more layers of the ML model for partition of the ML model, the partition comprising offload layers of the one or more layers of the ML model to be processed at the client machine; and means for causing the offload layers of the ML model to be downloaded to the client machine. In Example 33, the subject matter of Example 32 can optionally include the apparatus further configured to perform the method of any one of the Examples 18 to 20.

Example 34 is at least one machine readable medium comprising a plurality of instructions that in response to being executed on a computing device, cause the computing device to carry out a method according to any one of Examples 17-20. Example 35 is an apparatus for facilitating security optimizing compute distribution in a hybrid deep learning environment, configured to perform the method of any one of Examples 17-20. Example 36 is an apparatus for facilitating security optimizing compute distribution in a hybrid deep learning environment comprising means for performing the method of any one of claims 17 to 20. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium (e.g., non-transitory computer-readable storage medium) having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is a single one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    one or more processors to:
       determine security capabilities and compute capabilities of a client machine requesting to use a machine learning (ML) model hosted by the apparatus;
       determine, based on the security capabilities and based on exposure criteria of the ML model, that one or more layers of the ML model can be offloaded to the client machine for processing, wherein the exposure criteria comprises identification of a model protection level (MPL) that is a lowest layer of the one or more layers of the ML model that can be offloaded to the client machine without exposing the ML model to a security risk, the lowest layer counted from a first input layer of the one or more layers of the ML model;
       define, based on the compute capabilities of the client machine, a split level of the one or more layers of the ML model for partition of the ML model, the partition comprising offload layers of the one or more layers of the ML model to be processed at the client machine; and
       cause the offload layers of the ML model to be downloaded to the client machine.

2. The apparatus of claim 1, wherein the one or more processors to determine that the one or more layers of the ML model can be offloaded further comprises the one or more processors to compare the exposure criteria to the security capabilities, wherein the security capabilities identify a data protection level (DPL) of the one or more layers that can run on the client machine to ensure that confidential data of the client machine is not exposed.

3. The apparatus of claim 2, wherein offload of the one or more layers to the client machine is allowed in response to the DPL being less than or equal to the MPL.

4. The apparatus of claim 1, wherein the one or more processors to define the split level further comprises the one or more processors to identify the split level based on a level of compute power used to run a subset of the one or more layers defined by the split level being less than or equal to a compute power defined in the compute capabilities of the client machine.

5. The apparatus of claim 1, wherein the one or more layers of the ML model further comprise a set of client machine layers that are trained by the client machine and are run by the client machine, where client machine layers at least one of replace the offload layers of the ML model or are run in addition to the offload layers of the ML model.

6. The apparatus of claim 5, wherein training of the client machine layers of the ML model comprises back-propagating vectors to adjust first weights in the client machine layers without adjusting second weights in a common computing core of the ML model.

7. The apparatus of claim 6, wherein an inference stage of the ML model utilizes the client machine layers and the common computing core of the ML model, and wherein an inference signal is generated by processed by starting processing at the client machine layers, proceeding to processing at the common computing core, and returning to processing at the client machine layers to provide an inference result.

8. The apparatus of claim 1, wherein the one or more layers of the ML model comprise one or more stages of a multifunction perceptron architecture having a plurality of neurons to perform one or more neuron functions of the ML model, and wherein the plurality of neurons comprise heterogenous neurons including one or more of splitter neurons, mixer neurons, counter neurons, selector neurons, extractor neurons, or transformer neurons.

9. The apparatus of claim 8, wherein the split level for the partition of the ML model is defined in terms of the one or more stages of the multifunction perceptron architecture and identifies at least one stage of the ML model for offload to the client machine for at least one of training or inference of the ML model.

10. The apparatus of claim 1, wherein the one or more processors comprise one or more of a graphics processor, an application processor, and another processor, wherein the one or more processors are co-located on a common semiconductor package.

11. A non-transitory computer-readable storage medium having stored thereon executable computer program instructions that, when executed by one or more processors, cause the one or more processors to perform operations comprising:
  determining security capabilities and compute capabilities of a client machine requesting to use a machine learning (ML) model;
  determining, based on the security capabilities and based on exposure criteria of the ML model, that one or more layers of the ML model can be offloaded to the client machine for processing, wherein the exposure criteria comprises identification of a model protection level (MPL) that is a lowest layer of the one or more layers of the ML model that can be offloaded to the client machine without exposing the ML model to a security risk, the lowest layer counted from a first input layer of the one or more layers of the ML model;
  defining, based on the compute capabilities of the client machine, a split level of the one or more layers of the ML model for partition of the ML model, the partition comprising offload layers of the one or more layers of the ML model to be processed at the client machine; and
  causing the offload layers of the ML model to be downloaded to the client machine.

12. The non-transitory computer-readable storage medium of claim 11, wherein the operations further comprising determining that the one or more layers of the ML model can be offloaded further comprises the one or more processors to compare the exposure criteria to the security capabilities, wherein the security capabilities identify a data protection level (DPL) of the one or more layers that can run on the client machine to ensure that confidential data of the client machine is not exposed.

13. The non-transitory computer-readable storage medium of claim 11, wherein the one or more layers of the ML model further comprise a set of client machine layers that are trained by the client machine and are run by the client machine, where client machine layers at least one of replace the offload layers of the ML model or are run in addition to the offload layers of the ML model, and training of the client machine layers of the ML model comprises back-propagating vectors to adjust first weights in the client machine layers without adjusting second weights in a common computing core of the ML model.

14. The non-transitory computer-readable storage medium of claim 13, wherein an inference stage of the ML model utilizes the client machine layers and the common computing core of the ML model, and wherein an inference signal is generated by processed by starting processing at the client machine layers, proceeding to processing at the common computing core, and returning to processing at the client machine layers to provide an inference result.

15. The non-transitory computer-readable storage medium of claim 11, wherein the one or more layers of the ML model comprise one or more stages of a multifunction perceptron architecture having a plurality of neurons to perform one or more neuron functions of the ML model, and wherein the split level for the partition of the ML model is defined in terms of the one or more stages of the multifunction perceptron architecture and identifies at least one stage of the ML model for offload to the client machine for at least one of training or inference of the ML model.

16. A method comprising:
  determining security capabilities and compute capabilities of a client machine requesting to use a machine learning (ML) model;
  determining, based on the security capabilities and based on exposure criteria of the ML model, that one or more layers of the ML model can be offloaded to the client machine for processing, wherein the exposure criteria comprises identification of a model protection level (MPL) that is a lowest layer of the one or more layers of the ML model that can be offloaded to the client machine without exposing the ML model to a security risk, the lowest layer counted from a first input layer of the one or more layers of the ML model;
  defining, based on the compute capabilities of the client machine, a split level of the one or more layers of the ML model for partition of the ML model, the partition comprising offload layers of the one or more layers of the ML model to be processed at the client machine; and
  causing the offload layers of the ML model to be downloaded to the client machine.

17. The method of claim 16, wherein determining that the one or more layers of the ML model can be offloaded further comprises comparing the exposure criteria to the security capabilities, wherein the security capabilities identify a data protection level (DPL) of the one or more layers that can run on the client machine to ensure that confidential data of the client machine is not exposed.

18. The method of claim 16, wherein the one or more layers of the ML model further comprise a set of client machine layers that are trained by the client machine and are run by the client machine, where client machine layers at least one of replace the offload layers of the ML model or are run in addition to the offload layers of the ML model, and training of the client machine layers of the ML model comprises back-propagating vectors to adjust first weights in the client machine layers without adjusting second weights in a common computing core of the ML model.

19. The method of claim 16, wherein the one or more layers of the ML model comprise one or more stages of a multifunction perceptron architecture having a plurality of neurons to perform one or more neuron functions of the ML model, and wherein the split level for the partition of the ML model is defined in terms of the one or more stages of the multifunction perceptron architecture and identifies at least one stage of the ML model for offload to the client machine for at least one of training or inference of the ML model.

* * * * *